United States Patent
Moon et al.

(10) Patent No.: US 7,742,623 B1
(45) Date of Patent: Jun. 22, 2010

(54) METHOD AND SYSTEM FOR ESTIMATING GAZE TARGET, GAZE SEQUENCE, AND GAZE MAP FROM VIDEO

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 207 days.

(21) Appl. No.: 12/221,552

(22) Filed: Aug. 4, 2008

(51) Int. Cl.
*G06K 9/00* (2006.01)
(52) U.S. Cl. ..................................................... 382/103
(58) Field of Classification Search ................. 382/103, 382/117, 118, 155; 351/209, 205, 204, 210, 351/212
See application file for complete search history.

(56) References Cited

U.S. PATENT DOCUMENTS

| | | | |
|---|---|---|---|
| 5,797,046 A | 8/1998 | Nagano et al. | |
| 5,818,954 A | 10/1998 | Tomono et al. | |
| 6,154,559 A | 11/2000 | Beardsley | |
| 6,246,779 B1 | 6/2001 | Fukui et al. | |
| 7,043,056 B2 | 5/2006 | Edwards et al. | |
| 7,046,924 B2 | 5/2006 | Miller et al. | |
| 7,197,165 B2 | 3/2007 | Ryan | |
| 2008/0297589 A1* | 12/2008 | Kurtz et al. | 348/14.16 |

OTHER PUBLICATIONS

U.S. Appl. No. 10/605,637, Larsson, et al.

* cited by examiner

*Primary Examiner*—Timothy Thompson
*Assistant Examiner*—Tuyen Q Tra

(57) ABSTRACT

The present invention is a method and system to estimate the visual target that people are looking, based on automatic image measurements. The system utilizes image measurements from both face-view cameras and top-down view cameras. The cameras are calibrated with respect to the site and the visual target, so that the gaze target is determined from the estimated position and gaze direction of a person. Face detection and two-dimensional pose estimation locate and normalize the face of the person so that the eyes can be accurately localized and the three-dimensional facial pose can be estimated. The eye gaze is estimated based on either the positions of localized eyes and irises or on the eye image itself, depending on the quality of the image. The gaze direction is estimated from the eye gaze measurement in the context of the three-dimensional facial pose. From the top-down view the body of the person is detected and tracked, so that the position of the head is estimated using a body blob model that depends on the body position in the view. The gaze target is determined based on the estimated gaze direction, estimated head pose, and the camera calibration. The gaze target estimation can provide a gaze trajectory of the person or a collective gaze map from many instances of gaze.

38 Claims, 23 Drawing Sheets

| EYES | IMAGE | EYE GAZE | CONFIDENCE |
|---|---|---|---|
| EYES 1<br>426 | 421 | → | 0.95 |
| EYES 2<br>427 | 421 | ↖ | 0.9 |
| EYES 3<br>428 | 421 | → | 0.4 |
| EYES 4<br>429 | 421 | ↘ | 0.5 |
| EYES 5<br>430 | 421 | ← | 0.25 |
| ⋮ | ⋮ | ⋮ | ⋮ |

Fig. 15

METHOD AND SYSTEM FOR ESTIMATING GAZE TARGET, GAZE SEQUENCE, AND GAZE MAP FROM VIDEO

BACKGROUND OF THE INVENTION

1. Field of the Invention

The present invention is a method and system to estimate the visual target that people are looking at based on automatic image measurements.

2. Background of the Invention

A person's interest can often be revealed by observing where he or she is looking. In certain environments, how often a certain visual target receives attention can provide valuable information that is of high commercial significance. For example, more frequent shoppers' visual attentions toward certain products in a retail space could result in higher sales of products. The gaze change of a shopper can reveal his/her mental process, such as change of interest toward products. Furthermore, if one can estimate a "gaze map"—of how often each spatial region within a visual target receives visual attention—of a shelf space, the data can provide very valuable information to retailers and marketers. The collected statistics can be utilized by themselves to assess the commercial viability of a certain region in shelf space, which can then translate into the degree of success of certain products, product placement, packaging, or promotions. The information can also be analyzed in relation to other information, such as purchase data or shopper-product interaction data. For the advertisement industry, the information regarding how much each region in an advertisement display receives attention can be used to measure its effectiveness and improve its design accordingly. There can be other potential applications, such as human psychology/behavior research or interface design, that involve measurements of gaze.

The present invention introduces a comprehensive system and method to estimate a gaze target within a potential visual target. A visual target is an object that people view and the way people look at it—the spatial trajectory, the duration, or the frequency of gaze—carries some significance to a given application. The gaze target—the location within the visual target where the person's gaze is fixated—is estimated by measuring the eye gaze of the person as well as the facial pose of the person; the eye gaze of a person is defined as the orientation of the person's gaze relative to the person's face. An automated analysis of the person's image captured from at least one camera provides the measurement for estimating the gaze target. The cameras are placed and oriented so that they can capture the faces of potential viewers of the visual target; the cameras are typically placed near the visual target. The focal lengths of the camera lenses are determined to capture the faces large enough so that the gaze can be accurately estimated. A top-down view camera can be employed to estimate the floor position of the person, which helps to accurately identify the gaze target. The image analysis algorithm should be calibrated based on the camera placement and the geometry of the visual target. The effective resolution of the estimated gaze map is constrained by both the accuracy of the eye gaze estimation algorithm and the distance of the cameras to the person.

Recent developments in computer vision and artificial intelligence technology make it possible to detect and track people's faces and bodies from video sequences. Facial image analysis has been especially matured, so that faces can be detected and tracked from video images and the pose of the head and the shapes of the facial features can also be estimated. Especially, the three-dimensional facial pose and eye gaze can be measured to estimate the gaze target. Face detection and tracking handle the problem of locating faces and establishing correspondences among detected faces that belong to the same person. To be able to accurately locate the facial features, the two-dimensional (position, size, and orientation) pose of the face is first estimated. Accurate positions and sizes of facial features are estimated in a similar manner. The estimated positions of irises relative to the eyes along with the estimated head orientation reveal the shopper's gaze direction. However, because of the nonlinear way that different facial poses affect the appearance changes in eye image due to the eye gaze, a machine learning-based method is introduced to find the facial pose-dependent gaze direction estimation. The final gaze target is estimated based on the estimated gaze direction and the person position (more specifically, the head position). Because the head position relative to the body changes according to the position in the view, the head position is estimated by employing a view-dependent body blob model.

There have been prior attempts for automatically estimating the gaze direction of a human observer.

U.S. Pat. No. 5,797,046 of Nagano, et al. (hereinafter Nagano) disclosed a visual axis controllable optical apparatus, which is used in different postures. The optical apparatus includes a light detecting device for receiving light reflected by an eye, and detecting the intensity distribution of the received light, a storage device for storing personal data associated with a personal difference of the eye in correspondence with the different postures, and a visual axis detecting device for detecting a visual axis. The visual axis detecting device detects the position of the visual axis using the personal data stored in the storage device corresponding to the posture of the optical apparatus, and the intensity distribution detected by the light detecting device.

U.S. Pat. No. 5,818,954 of Tomono, et al. (hereinafter Tomono) disclosed a method that calculates a position of the center of the eyeball as a fixed displacement from an origin of a facial coordinate system established by detection of three points on the face, and computes a vector therefrom to the center of the pupil. The vector and the detected position of the pupil are used to determine the visual axis.

U.S. Pat. No. 6,154,559 of Beardsley (hereinafter Beardsley) disclosed a system that is designed to classify the gaze direction of an individual observing a number of surrounding objects. The system utilizes a qualitative approach in which frequently occurring head poses of the individual are automatically identified and labeled according to their association with the surrounding objects. In conjunction with processing of the eye pose, this enables the classification of gaze direction. In one embodiment, each observed head pose of the individual is automatically associated with a bin in a "pose-space histogram." This histogram records the frequency of different head poses over an extended period of time. Each peak is labeled using a qualitative description of the environment around the individual. The labeled histogram is then used to classify the head pose of the individual in all subsequent images. This head pose processing is augmented with eye pose processing, enabling the system to rapidly classify gaze direction without accurate a priori information about the calibration of the camera utilized to view the individual, without accurate a priori three-dimensional measurements of the geometry of the environment around the individual, and without any need to compute accurate three-dimensional metric measurements of the individual's location, head pose or eye direction at run-time.

U.S. Pat. No. 6,246,779 of Fukui, et al. (hereinafter Fukui) disclosed a gaze position detection apparatus. A dictionary section previously stores a plurality of dictionary patterns representing a user's image including pupils. An image input section inputs an image including the user's pupils. A feature point extraction section extracts at least one feature point from a face area on the input image. A pattern extraction section geometrically transforms the input image according to a relative position of the feature point on the input image, and extracts a pattern including the user's pupils from the transformed image. A gaze position determination section compares the extracted pattern with the plurality of dictionary patterns, and determines the user's gaze position according to the dictionary pattern matched with the extracted pattern.

U.S. Pat. No. 7,043,056 of Edwards, et al. (hereinafter Edwards) disclosed a method of determining an eye gaze direction of an observer, comprising the steps of: (a) capturing at least one image of the observer and determining a head pose angle of the observer; (b) utilizing the head pose angle to locate an expected eye position of the observer, and (c) analyzing the expected eye position to locate at least one eye of the observer and observing the location of the eye to determine the gaze direction.

U.S. Pat. No. 7,046,924 of Miller, et al. (hereinafter Miller) disclosed a method that is provided for determining an area of importance in an archival image. In accordance with this method, eye information, including eye gaze direction information captured during an image capture sequence for the archival image, is obtained. An area of importance in the archival image is determined based upon the eye information. Area of importance data characterizing the area of importance is associated with the archival image.

U.S. Pat. No. 7,197,165 of Ryan (hereinafter Ryan) disclosed a computer processing apparatus, where frames of image data received from a camera are processed to track the eyes of a user in each image. A three-dimensional computer model of a head is stored, and search regions are defined in the three-dimensional space corresponding to the eyes and eyebrows. For each image, pixels within the projection of the search regions from the three-dimensional space to the two-dimensional image space are sampled to determine a representative intensity value for each of the search regions. Positions for the eyes in the three-dimensional space are then calculated based on the determined values. The three-dimensional computer model and search bands are moved within the three-dimensional space to align the eyes with the calculated eye positions. In this way, when the next image is processed, the search bands project into the image from a head configuration determined from the previous image. This facilitates reliable and accurate eye tracking.

U.S. patent application Ser. No. 10/605,637 of Larsson, et al. (hereinafter Larsson) disclosed a method for analyzing ocular and/or head orientation characteristics of a subject. A detection and quantification of the position of a driver's head and/or eye movements are made relative to the environment. Tests of the data are made, and from the data, locations of experienced areas/objects-of-subject-interest are deduced. When a driver of a vehicle is the subject, these areas/objects-of-driver-interest may be inside or outside the vehicle, and may be constituted by (1) "things" such as audio controls, speedometers and other gauges, and (2) areas or positions such as "road ahead" and lane-change clearance space in adjacent lanes. In order to "standardize" the tracking data with respect to the vehicle of interest, the quantification of the position of the driver's head is normalized to the reference-base position, thereby enabling deducement of the location(s) where the driver has shown an interest based on sensed information regarding either or both of (1) driver ocular orientation or (2) driver head orientation.

In Nagano, the gaze direction is estimated based on the optical signal of the light reflected by the iris, and on the stored personal signature of the reflection. In Tomono, the measured position of the iris relative to the measured facial coordinate is used to estimate the gaze. In Beardsley, the gaze target is recognized based on the measurement of the head pose and the correlation between a known visual target and the head pose, using the head pose histogram of frequent gaze targets. In Fukui, the gaze is estimated by comparing the measured facial image feature pattern against the stored facial image feature patterns, using neural networks. In Edwards, the eye gaze direction is estimated by first determining the head pose angle and then by locating the iris position relative to the eye region based on a precise geometric model of eyes. In Miller, the eye gaze direction and its path are estimated to identify an area of importance in images. In Ryan, a three-dimensional head model is utilized to estimate the head pose and gaze. The present invention employs basic ideas similar to the mentioned inventions; first estimate the head pose, and locate the eye and iris positions. The position of the irises relative to the localized eyes provides the data to estimate the gaze direction. However, we adopt a series of machine learning-based approaches to accurately and robustly estimate the gaze under realistic imaging conditions; a two-dimensional facial pose estimation followed by a three-dimensional facial pose estimation, where both estimations utilize multiple learning machines. The facial features are also accurately localized based on the estimated global facial geometry, again using combinations of multiple learning machines, and each take part in localizing a specific facial feature. Each of these machine learning-based estimations of poses or locations utilizes a set of filters specifically designed to extract image features that are relevant to a given estimation problem. Finally, the eye gaze estimates are interpreted differently with varying head pose estimates, to estimate the gaze direction and gaze target. Unlike most of the prior inventions, which focus on close-range visual targets, the present invention aims to estimate gaze regardless of distance, using a series of robust methods for face detection, pose estimation, and eye gaze estimation. To deal with the problem of gaze target estimation from a distance, the position of the head (the starting point of the gaze) is robustly estimated. Due to the varying head position relative to the body, the head position is estimated by employing a view-dependent body blob model.

In summary, the present invention provides robust facial pose estimation and eye gaze estimation approaches by adopting a series of machine learning-based approaches to accurately and robustly estimate the gaze under realistic imaging conditions, without using specialized imaging devices and without requiring close-range images or prior three-dimensional face models. The eye gaze is processed in the context of varying facial pose, so that the appearance changes of the eyes due to pose changes can be properly handled. The top-down view image analysis for locating the head of the viewer helps to achieve accurate gaze target estimation. The present invention also provides a comprehensive framework for site calibration, performance characterization, and site-specific data collection.

SUMMARY

The present invention is a method and system for automatically identifying the gaze target of a person within a visual target, by measuring the person's head pose and eye gaze.

It is one of the objectives of the first step of the processing to take measurements of the site and the visual target, to come up with a camera specifications and placement plan. The step will also provide the target grid resolution, as well as the calibration for the face-view cameras and the top-down view camera.

It is one of the objectives of the second step of the processing to detect faces, track them individually, and estimate both the two-dimensional and three-dimensional poses of each of the tracked faces. Given a facial image sequence, the step detects any human faces and keeps each of their individual identities by tracking them. Using learning machines trained from facial pose estimation training, the two-dimensional facial pose estimation step computes the (X, Y) shift, size variation, and orientation of the face inside the face detection window to normalize the facial image, as well as to help the three-dimensional pose estimation. The three-dimensional facial pose estimation computes the yaw (horizontal rotation) and pitch (vertical rotation) angles of the face, after the two-dimensional pose has been normalized.

It is one of the objectives of the third step of the processing to localize the facial features and estimate the eye gaze. The facial feature localization utilizes facial feature localization machines, where multiple learning machines are trained for each facial feature that is already roughly localized based on the estimated two-dimensional facial pose. The eye gaze is estimated based on the deviation of the estimated iris positions from the estimated eye positions.

It is one of the objectives of the fourth step of the processing to estimate the gaze direction of a person, based on the estimated three-dimensional facial pose and the eye gaze. The step computes the gaze direction by finding a three-dimensional facial pose-dependent mapping from the three-dimensional facial pose and the eye gaze to the gaze direction.

It is one of the objectives of the fifth step of the processing to estimate the floor position of the person's head from the top-down view of the person whose facial image is being analyzed for estimating the gaze. First, the body of the person is detected and tracked. Using a body blob model that depends on the position in the top-down view, an accurate head position is estimated.

It is one of the objectives of the sixth step of the processing to estimate the gaze target of the person based on the estimated gaze direction and person position. From the gaze target estimates of the person over time, a gaze trajectory can be constructed. From the gaze direction estimates of a large number of people, a gaze map can be estimated.

DRAWINGS

Figures

FIG. 15 shows an exemplary embodiment of the eye gaze annotation step.

DETAILED DESCRIPTION OF THE INVENTION

Figure 1:
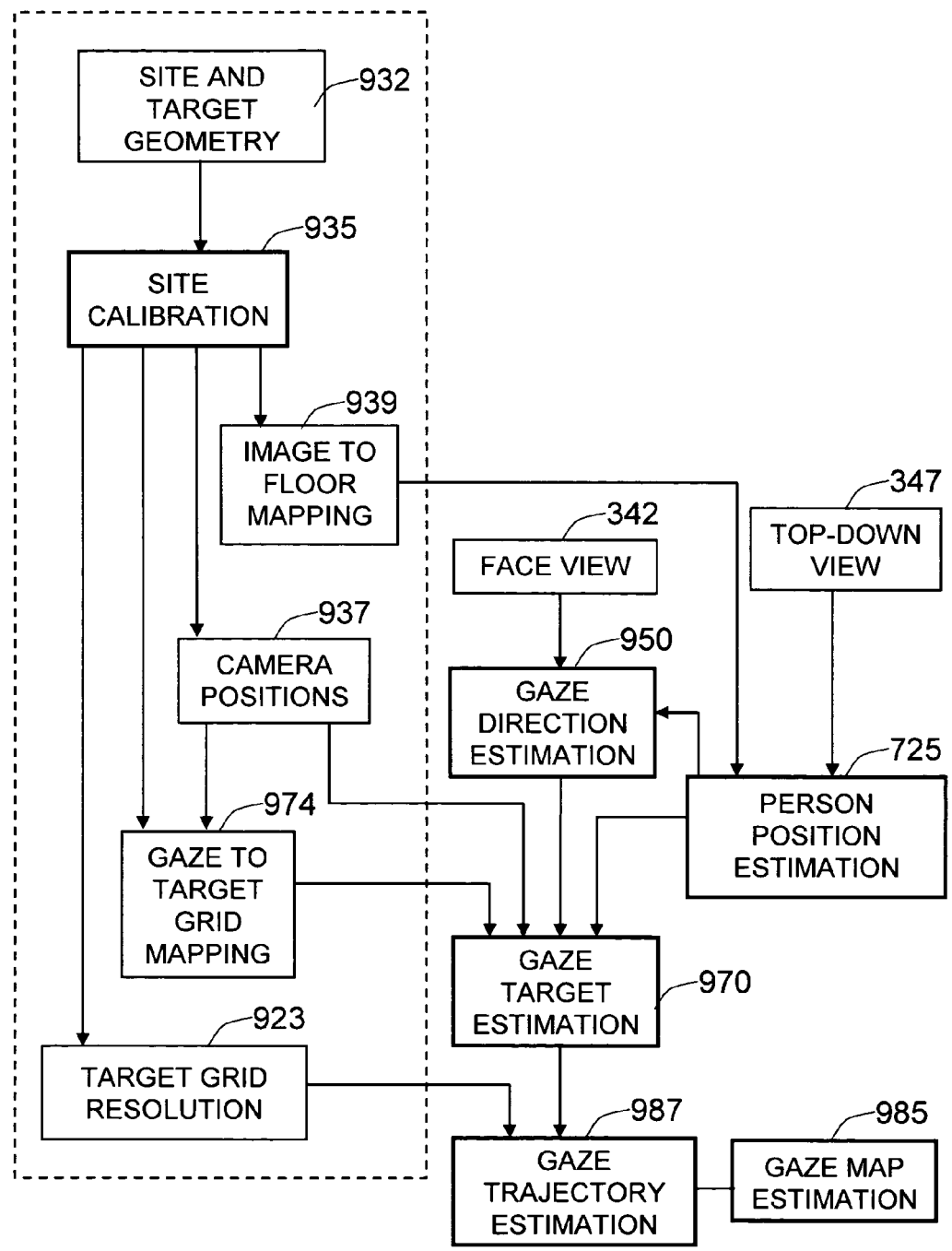
FIG. 1 is an overall scheme of the system in a preferred embodiment of the invention.

FIG. 1 is an overall scheme of the system in a preferred embodiment of the invention. The procedure in the dashed box illustrates off-line processing that is necessary for some of the modules of the system. First, measurements of the site and target geometry 932 are provided, so that the site calibration 935 step can generate the image to floor mapping 939; the mapping is used in the person position estimation 725 step to convert the image coordinates of the tracked people to the world coordinates on the floor. The site calibration 935 step also generates gaze to target grid mapping 974, so that the gaze direction estimate 952 from the gaze direction estimation 950 step can be interpreted to gaze target 925 in the gaze target estimation 970 step. The target grid resolution 923 can also be derived from the site calibration 935 step so that the gaze trajectory estimation 987 or gaze map estimation 985 can be performed up to that precision.

Figure 2:
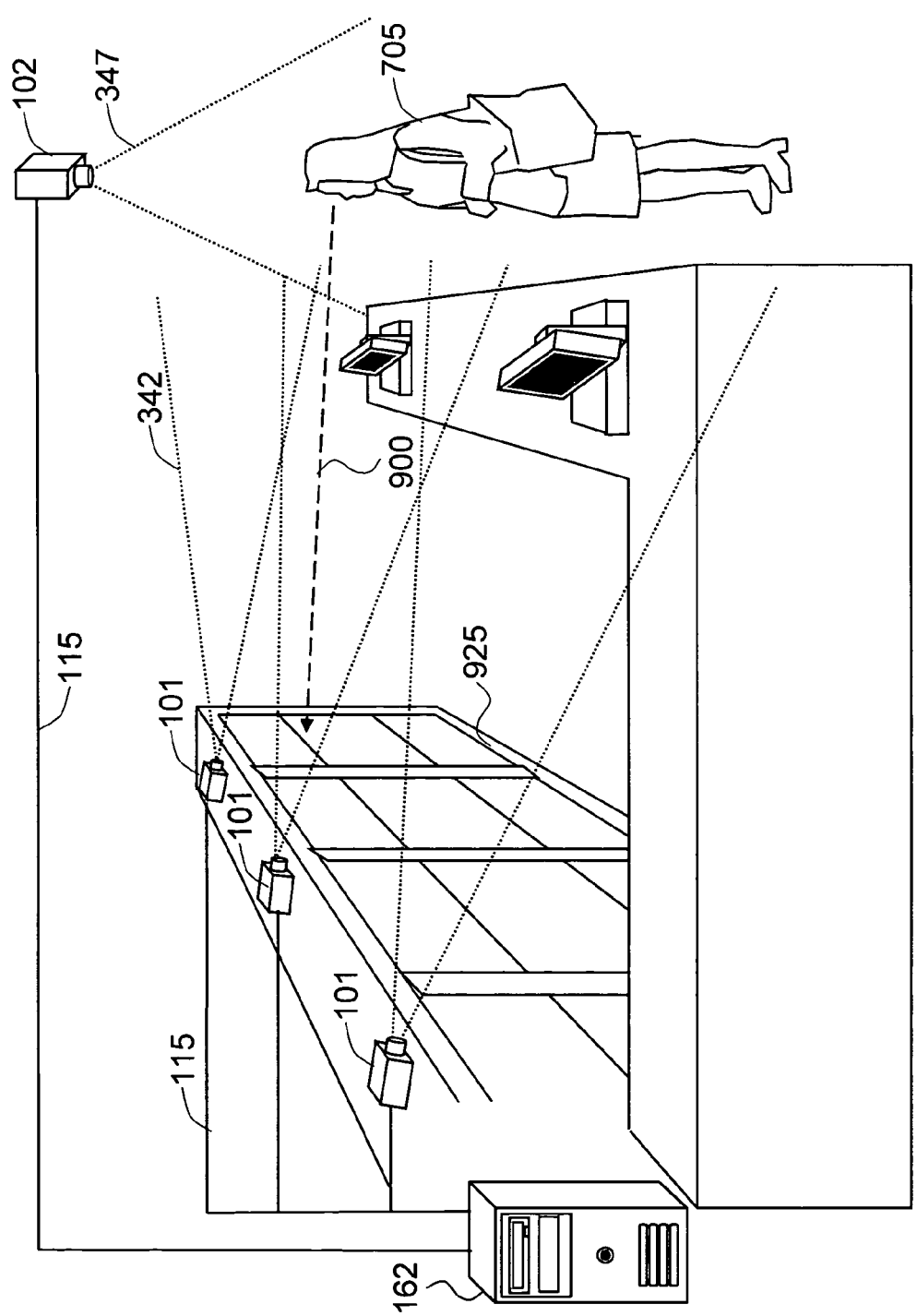
FIG. 2 shows a view of the system of the invention in an operational environment in an exemplary embodiment.

FIG. 2 shows a view of the system of the invention in an operational environment in an exemplary embodiment. The first means for capturing images 101 is placed near the visual target 920 to capture the face view 342 of the viewer 705 looking at the visual target 920. The second means for capturing images 102 is placed at a different position so as to capture the top-down view 347 of the body image of the viewer 705. The video feeds from both the first means for capturing images 101 and the second means for capturing images 102 are connected to the control and processing system 162 via means for video interface 115 and processed by the control and processing system 162. The video feed from the first means for capturing images 101 is processed by the control and processing system 162 to estimate the gaze direction 901. The video feed from the second means for capturing images 102 is processed to estimate the position of the viewer 705.

Figure 3:
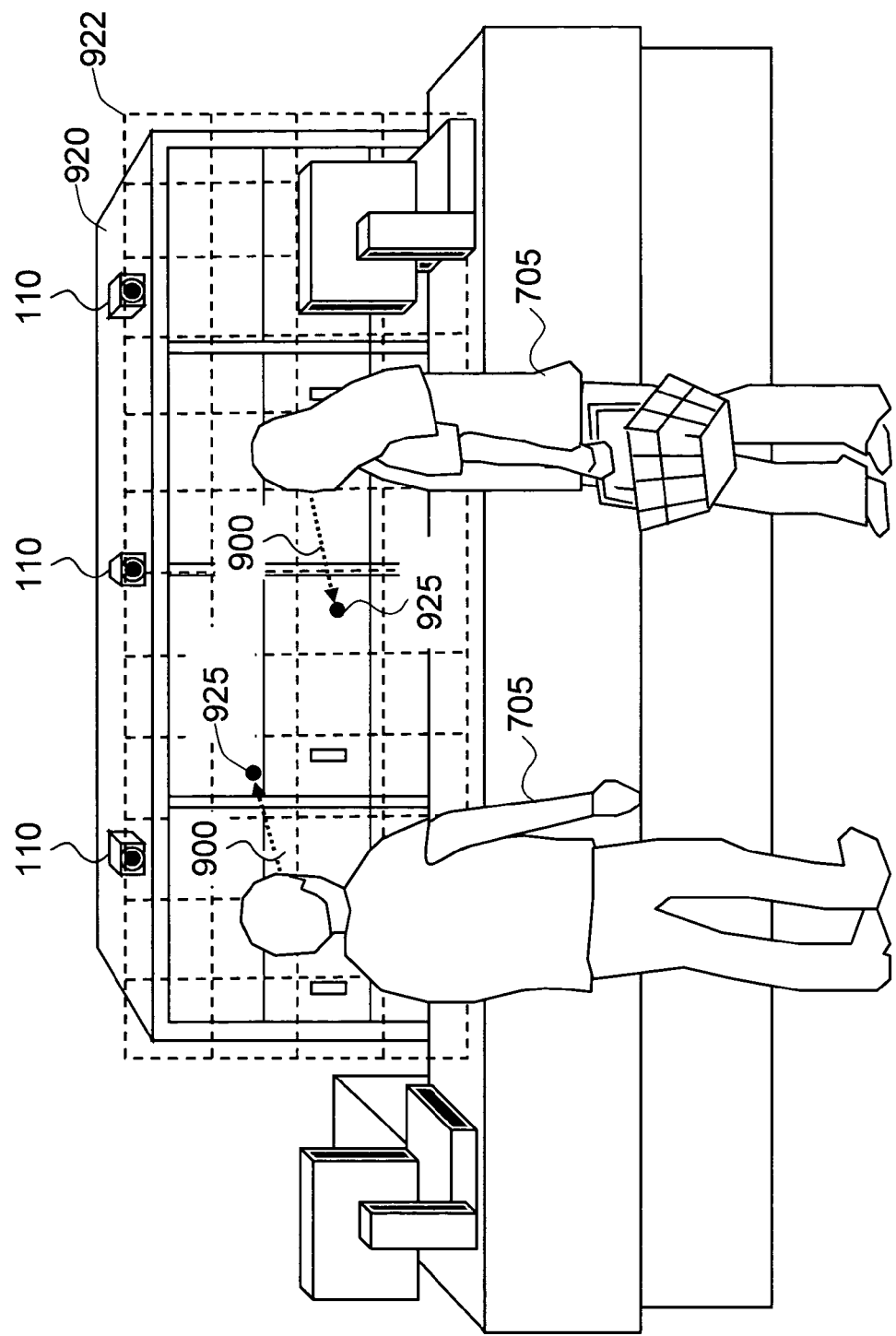
FIG. 3 shows the visual target and the estimated gaze target in a visual target grid in an exemplary embodiment of the present invention.

FIG. 3 shows the visual target 920 and the estimated gaze target 925 in the visual target grid 922 in an exemplary embodiment of the present invention. In this embodiment, each square block in the visual target grid 922 represents a location in a shelf space that is of interest. The size of the block represents the target grid resolution 923, and is determined from the site calibration 935 step. Based on the analysis of the images from the face-view camera 110, the gaze direction 901 of each viewer 705 is estimated and is shown as a dotted arrow, and the gaze target 925 is estimated and shown as a black dot.

Figure 4:
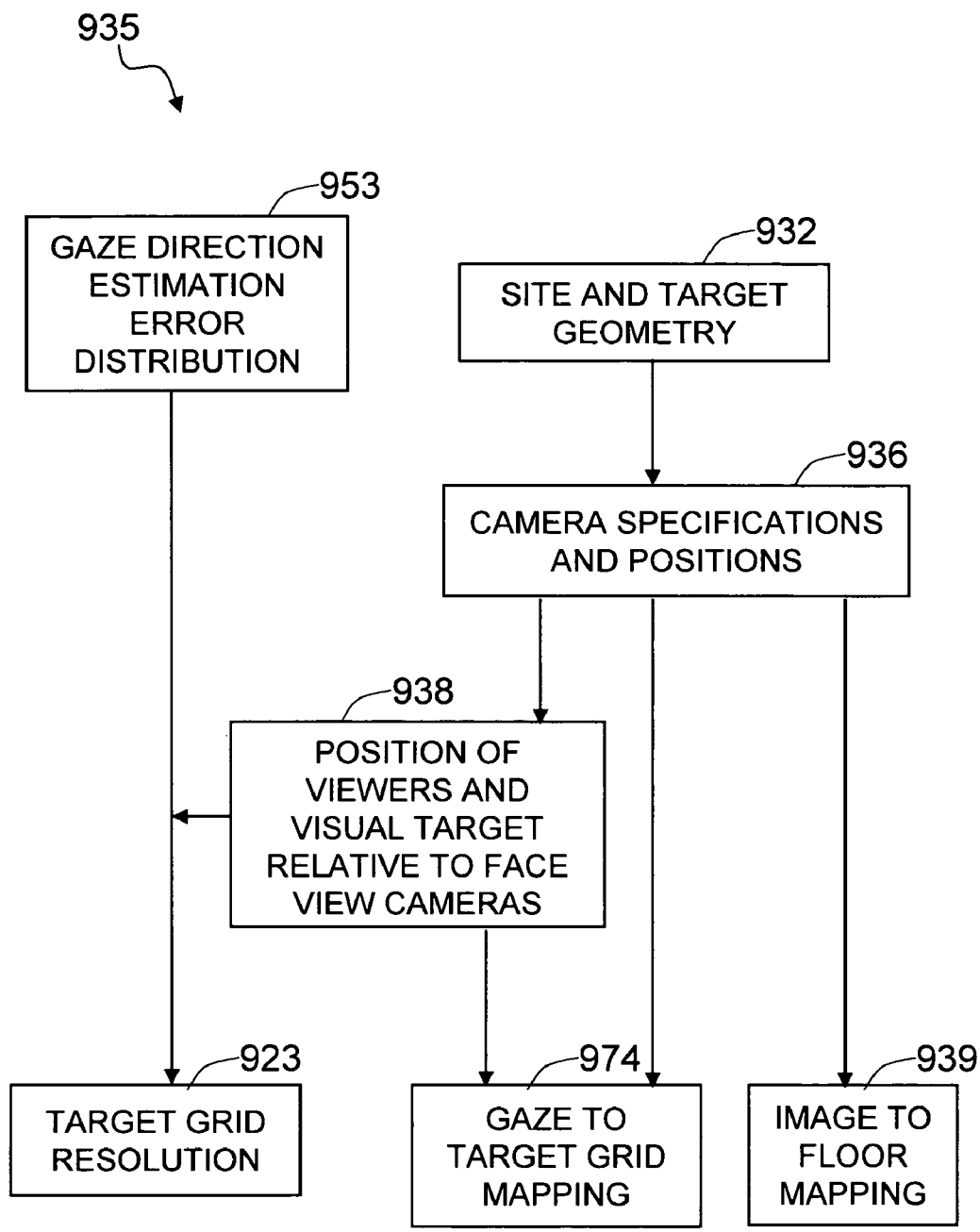
FIG. 4 shows the site calibration step in an exemplary embodiment of the present invention.

FIG. 4 shows the site calibration 935 step in an exemplary embodiment of the present invention. Two inputs to the step are the gaze direction estimation error distribution 953 and the measured site and target geometry 932. The gaze direction estimation error distribution 953 represents the distribution of errors in gaze direction, and is provided by an empirical evaluation of the algorithm. The site and target geometry 932 includes the size of the area to be observed by cameras, the distance between the gaze target and the position where the viewers typically stand to watch, the size of the visual target 920, etc. From the site and target geometry 932, the camera specifications (focal length and field-of-view angle) and positions (including the orientations) 936 are determined to cover the areas to be monitored. In typical scenarios, multiple face-view cameras are employed. Then the resulting position of the visual target and the viewers relative to face-view cameras 938 determines the target grid resolution 923 from the gaze direction estimation error distribution 923. Here, a representative position of the viewer 705 is used. The same error distribution (938) is used to compute the gaze to target grid mapping 974, so that the eye gaze estimate 961 can be interpreted in world coordinates to identify the location of the gaze target 925 within the visual target 920. It is important to interpret the gaze direction in the context of each face view camera 110 (especially the camera orientation), because the estimated gaze direction is the gaze angle relative to the camera. The camera specifications and positions 936 (especially the camera height) is used to calibrate the top-down view 347; that is, to compute the image to floor mapping 939.

Figure 5:
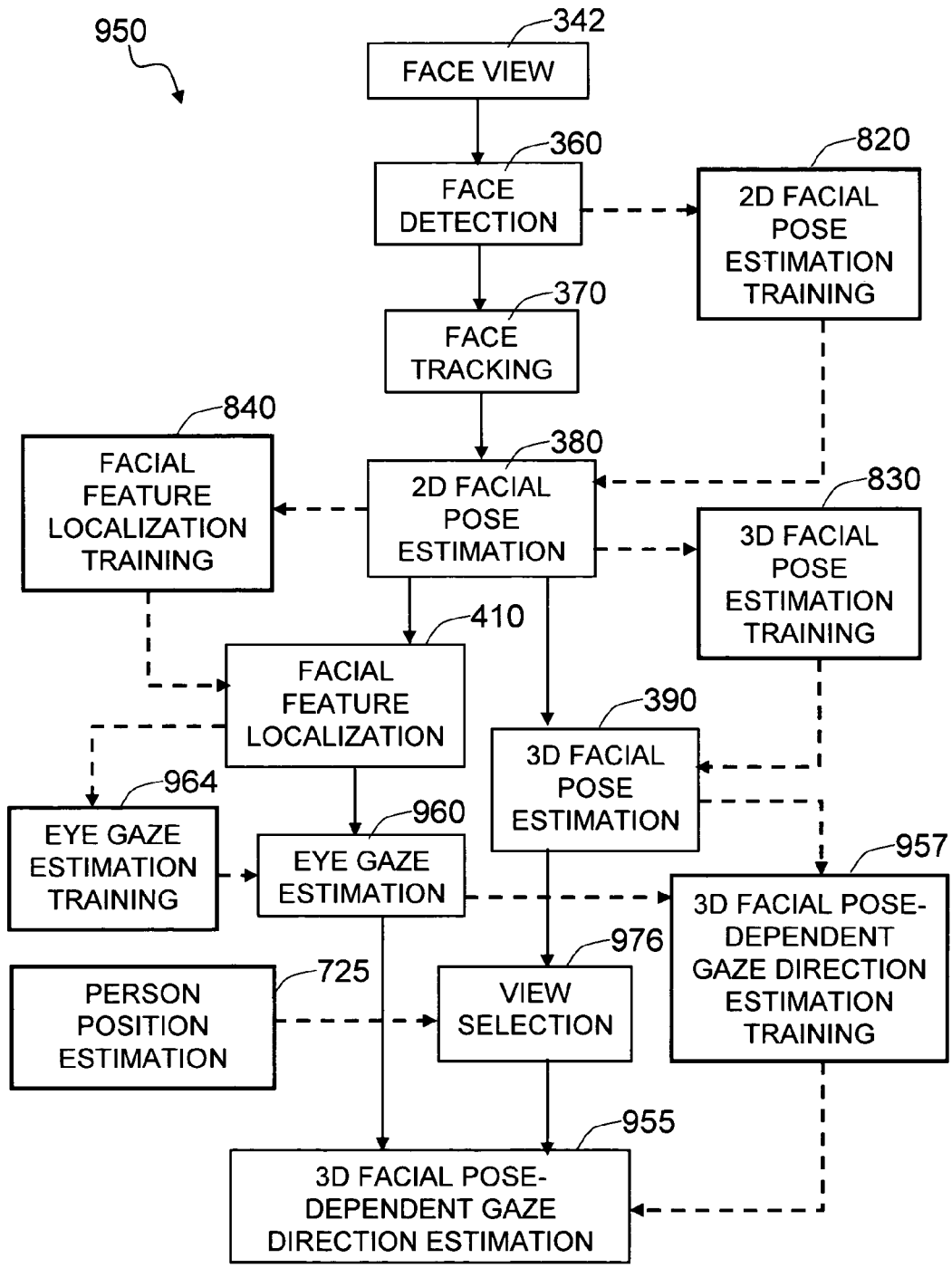
FIG. 5 shows the steps of gaze direction estimation, along with off-line training steps necessary for some of the steps, and a data flow providing an appropriate collection of training data to each of the training steps.

FIG. 5 shows the steps of gaze direction estimation 950, along with off-line training steps necessary for some of the steps, and a data flow providing an appropriate collection of training data to each of the training steps. First, the face view 342 from the face-view camera 110 captures the face of a viewer 705. The face detection 360 step detects the face and estimates its approximate position and size. The face tracking 370 step maintains the identities of the faces so that they belong to the same person. The detected faces along with their ground-truth positions, sizes, and orientations constitute the training data for two-dimensional facial pose estimation training 820. The tracked faces then go through the two-dimensional facial pose estimation 380 step, where the learning machines trained in the two-dimensional facial pose estimation training 820 step are employed. The facial images, whose positions, sizes, and orientations are corrected according to the estimated two-dimensional poses, are fed to both the three-dimensional facial pose estimation training 830 and the facial feature localization training 840. The three-dimensional facial pose estimation training 830 requires the ground-truth yaw and pitch angles of each face, and the facial feature localization training 840 requires the two-dimensional geometry (position, size, and orientation) of each facial feature of faces. The facial feature localization training 840 is carried out independently for each facial feature. The facial images whose two-dimensional pose have been estimated and corrected are fed to the three-dimensional facial pose estimation 390 step to estimate the yaw and pitch angles of the faces; they are also fed to the facial feature localization 410 step to accurately localize the individual facial features. Especially, the localized and normalized (so that they are aligned to the standard position and size) eye images are further trained to estimate the eye gaze in the eye gaze estimation training 964 step. Then the trained learning machines estimate the eye gaze in the eye gaze estimation 960 step. In an exemplary embodiment where high-resolution facial images are available, eye gaze is estimated from the difference between the position of the iris (estimated from facial feature localization) and the eye center position (also estimated from facial feature localization). The three-dimensional facial pose estimated from the three-dimensional facial pose estimation 390 step along with the ground-truth eye gaze data are used to train the three-dimensional facial pose-dependent gaze direction estimation training 957. The trained machines are employed in the three-dimensional facial pose-dependent gaze direction estimation 955 step, to estimate the gaze direction. In another embodiment where the resolution of the facial images is low or the images are of low quality, the eye image itself along with the three-dimensional facial pose directly trains the three-dimensional facial pose-dependent gaze direction estimation training 957. In this embodiment, the eye gaze estimation training 964 step and eye gaze estimation 960 step are skipped. In another embodiment, the system switches between two modes depending on the distance of the face from the camera. The first mode is the explicit eye gaze estimation 960 step followed by the three-dimensional facial pose-dependent gaze direction estimation 955 step. The second mode is where the three-dimensional facial pose-dependent gaze direction estimation 955 handles the gaze direction estimation 955 without explicitly estimating the eye gaze.

In an exemplary embodiment where multiple cameras are employed, the best view is selected in the view selection 976 step, and the view that is determined to provide the most accurate gaze direction estimation 950 is fed to the three-dimensional facial pose-dependent gaze direction estimation 955. The correspondences between faces appearing to different face views are made based on the person position estimate 726 from the person position estimation 725 step.

Figure 6:
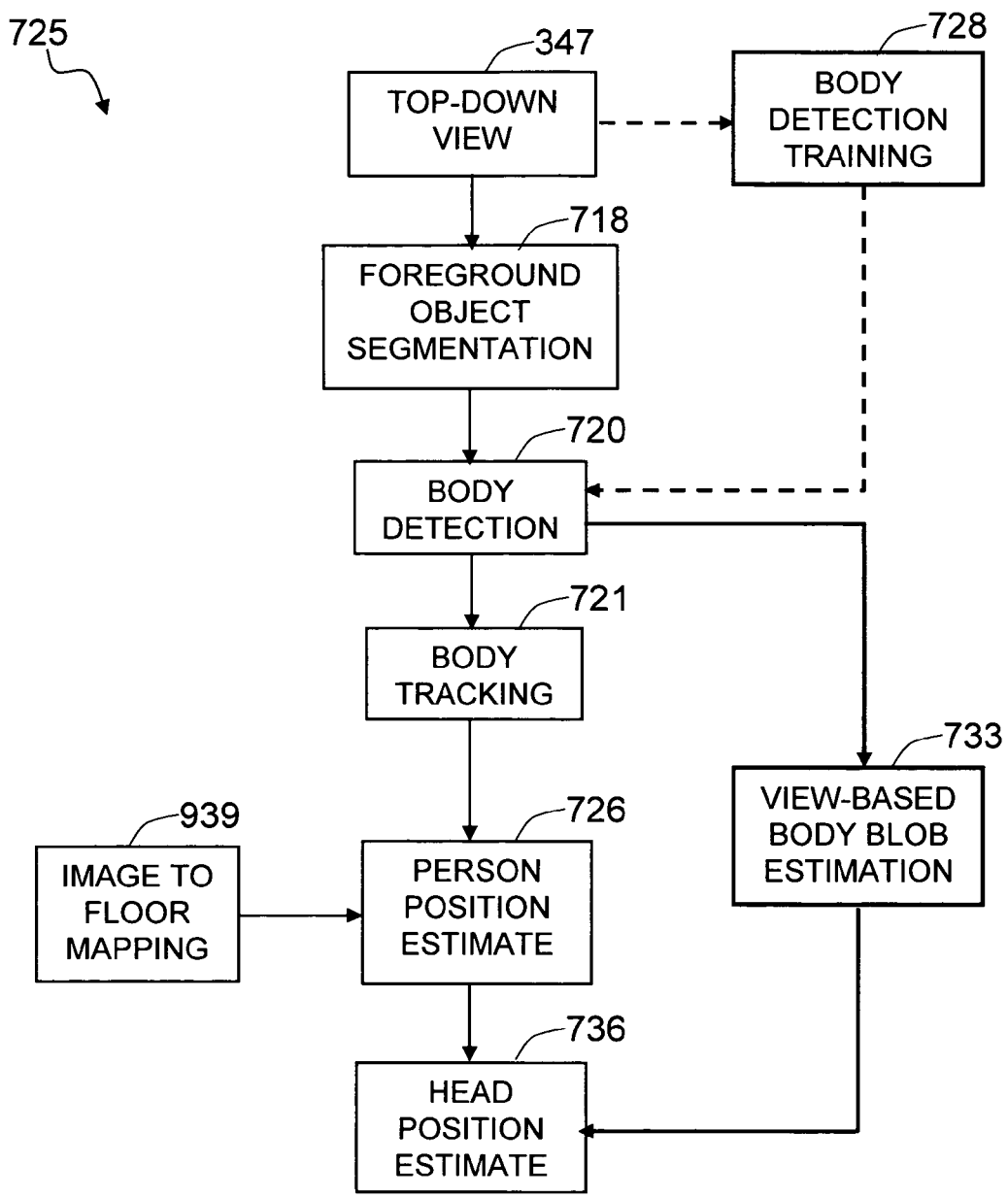
FIG. 6 shows the steps in person position estimation.

FIG. 6 shows the steps in person position estimation 725. The body detection training 728 step generates learning machines necessary for the body detection 722 step. The body detection training 728 utilizes the top-down view 347 images of people to train learning machines for the body detection 720 step. In operation, the top-down view 347 is first processed by foreground object segmentation 718 to identify regions where people's body images appear against the static background. This step serves both to limit the search space for body detection and to reduce false detections. The body detection 720 step then searches the foreground region for human bodies. The body tracking 721 step keeps identities of the people so that the correspondences among body images can be established. The image-to-floor mapping 939 computed from the site calibration 935 step changes the image coordinates of the bodies into the world coordinates on the floor. In the top-down view 347 of a human body image, the position of the head—the measurement that is more relevant to the gaze target estimation 970—relative to the body center of the detected body—depends on its position in the view. The view-based body blob estimation 733 step finds the shape and orientation of the blob according to the prior model of the orientation of the human figure at each floor position in the view. The estimated view-based body blob is used to accurately locate the head position 735.

Figure 7:
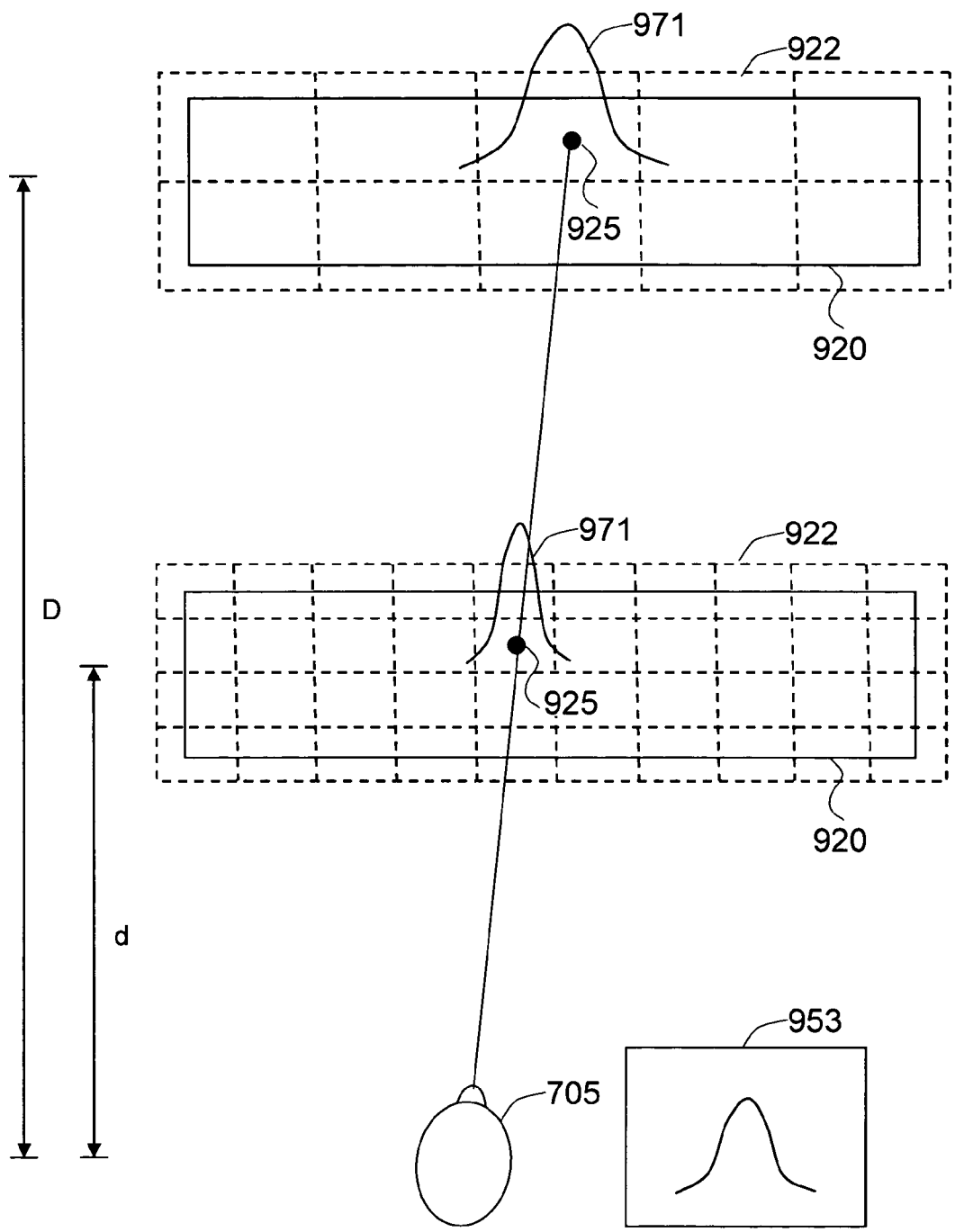
FIG. 7 shows one of the features of the site calibration step where the target resolution is being determined.

FIG. 7 shows one of the features of the site calibration 935 step where the target grid resolution 923 is being determined, in an exemplary embodiment of the present invention. The gaze direction estimation error distribution 953 is the spatial distribution of the gaze direction estimation error. The accuracy of the gaze target estimate should be derived from the gaze direction estimation error distribution 953, but will depend on the distance. When the typical distance between the viewer 705 and a visual target 920 (denoted by the lower rectangle in the figure) is small (denoted as d), the gaze target estimation error distribution 971 will have a narrow shape that has less uncertainty. When another visual target 920 (denoted by the upper rectangle) is positioned at twice the distance (denoted as D), the gaze target estimation error distribution 971 will have a flat shape that has more uncertainty. The distribution is used to determine the effective resolution, or the size of the target grid 922, of the visual target.

Figure 8:
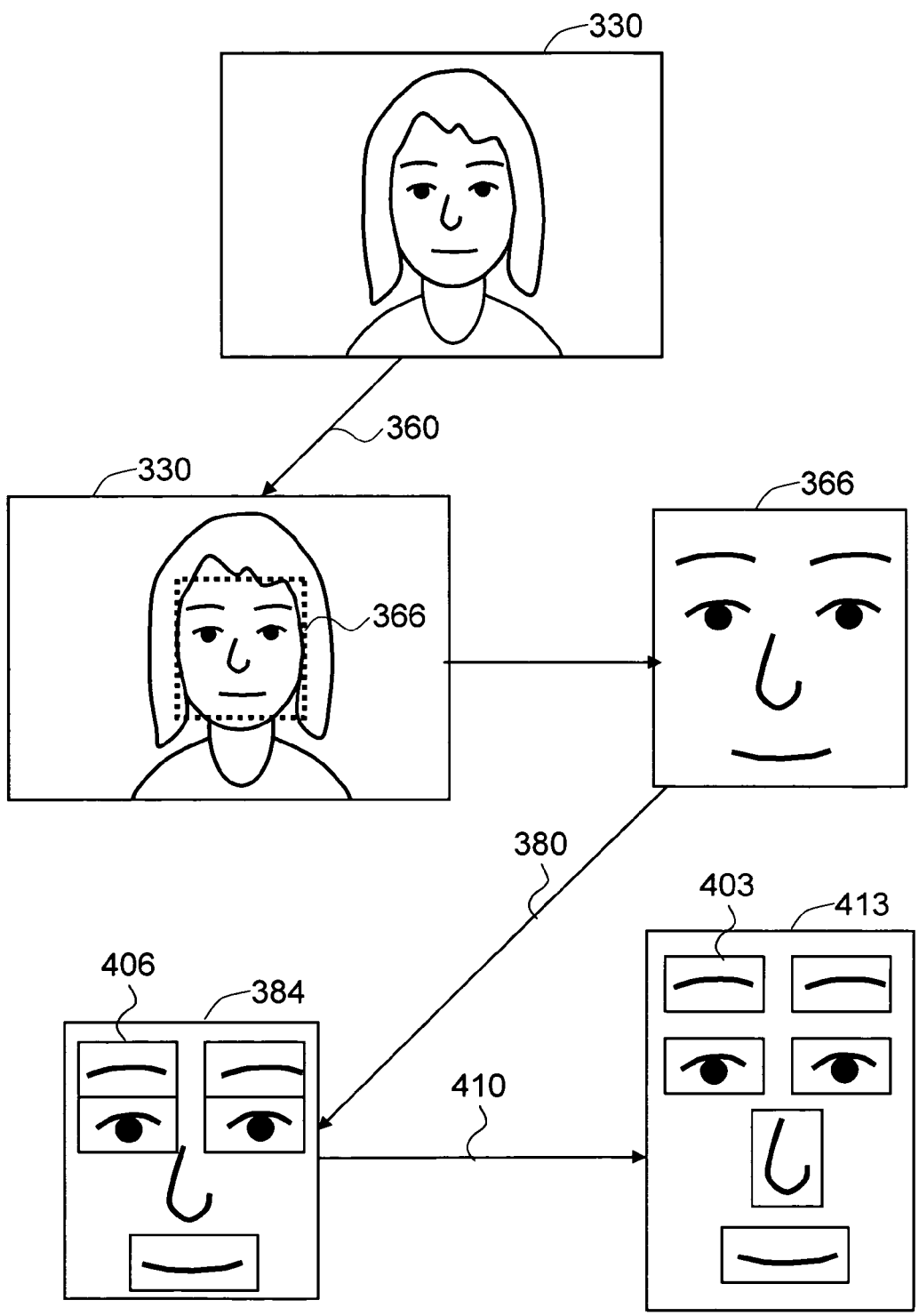
FIG. 8 shows a series of facial image processing steps, from face detection, to two-dimensional facial pose estimation, and to facial feature localization.

FIG. 8 shows a series of facial image processing steps, from face detection 360, to two-dimensional facial pose estimation 380, and to facial feature localization 410. Any image-based face detection algorithm can be used to detect human faces from an input image frame 330. Typically, a machine learning-based face detection algorithm is employed. The face detection algorithm produces a face window 366 that corresponds to the locations and the sizes of the detected face. The two-dimensional facial pose estimation 380 step estimates the two-dimensional pose of the face to normalize the face to a localized facial image 384, where each facial feature is approximately localized within a standard facial feature window 406. The facial feature localization 410 step then finds the accurate locations of each facial feature to extract them in a facial feature window 403.

Figure 9:
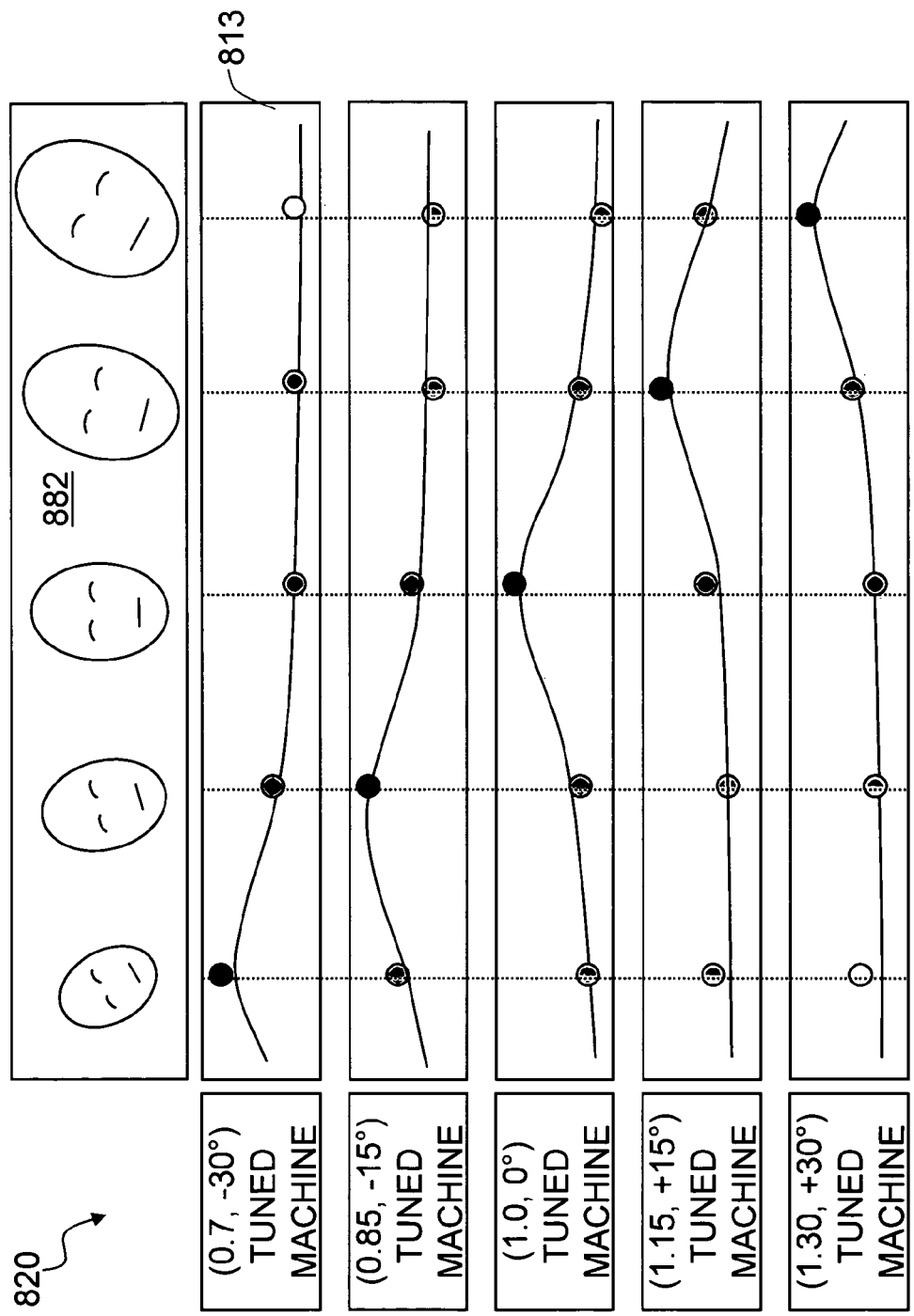
FIG. 9 shows a two-dimensional facial pose estimation training scheme in an exemplary embodiment of the present invention.

FIG. 9 shows a two-dimensional facial pose estimation training scheme 512 in an exemplary embodiment of the present invention. The training faces 882 are generated by applying the random perturbation of the (xf, yf) position, size sf, and the orientation of to each of the manually aligned faces. The ranges (or distribution) of the perturbation are chosen to be the same as the ranges (or distribution) of actual geometric variation of the faces from the face detection. Given an input face, the machine having the inherent pose of (x, y, x, o) is trained to output the likelihood of the given input face having the inherent pose. If the input training face has the pose (xf, yf, sf, of), then the target output is the Gaussian likelihood: $L=\mathrm{Exp}(-(xf-x)*(xf-x)/kx-(yf-y)*(yf-y)/ky-(sf-s)*(sf-s)/ks-(of-o)*(of-o)/ko)$. kx, ky, ks, ko are constants determined empirically. The figure also illustrates the response 813 profile that each machine is trained to learn. Each machine is trained to produce a peak for the faces having the corresponding two-dimensional pose, and to produce gradually lower values as the two-dimensional pose changes from the inherent two-dimensional pose of the machine. The figure is shown only for the two dimensions (s, o)=(scale, orientation) for the purpose of clear presentation.

Figure 10:
FIG. 10 shows an exemplary sampling of (yaw, pitch) ranges for three-dimensional facial pose estimation in an exemplary embodiment of the present invention.

FIG. 10 shows an exemplary sampling of (yaw, pitch) ranges for three-dimensional facial pose estimation 390 in an exemplary embodiment of the present invention. In one of the exemplary embodiments, each set (yaw, pitch) of geometric parameters is chosen by a sampling from the ranges of possible values. The range is typically determined by the target pose ranges to be estimated. In the exemplary embodiment shown in the figure, the table shows such sampled pose bins, where each pose dimension is split into 5 pose bins.

Figure 11:
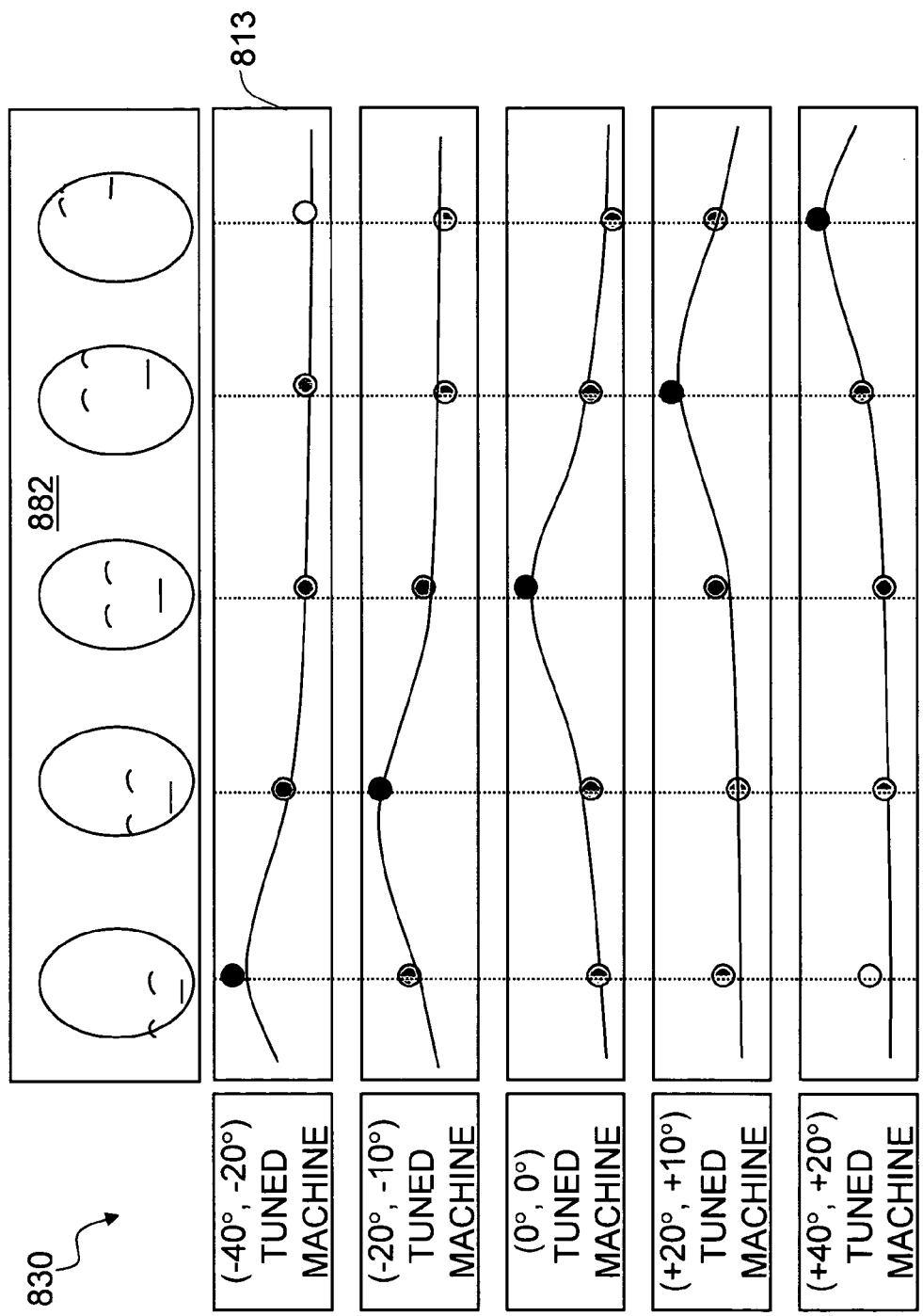
FIG. 11 shows a three-dimensional facial pose estimation training scheme in an exemplary embodiment of the present invention.

FIG. 11 shows a three-dimensional facial pose estimation training scheme 830 in an exemplary embodiment of the present invention. The facial images used for training are typically normalized from two-dimensional facial pose estimation 380, so that the system estimates three-dimensional facial pose more efficiently. The figure illustrates the response 813 profile that each machine is trained to learn. Each machine is trained to produce a peak for the faces having the corresponding (yw, pt), and to produce gradually lower values as the (yw, pt) changes from the inherent (yw, pt) of the machine. The mathematical expression for the response 813 profile is very similar to the equation for the case of two-dimensional facial pose estimation training 820.

Figure 12:
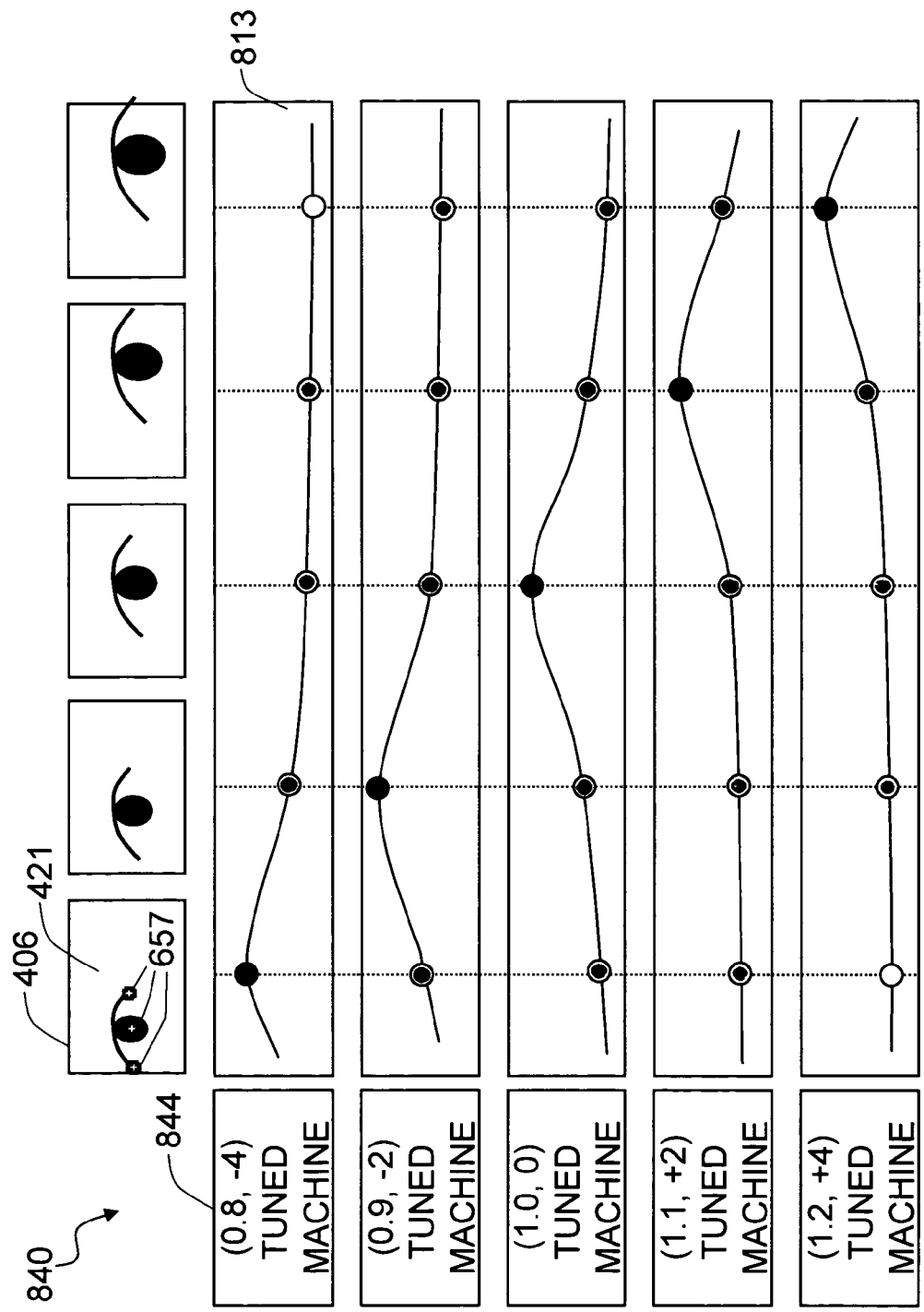
FIG. 12 shows a facial feature localization training scheme in an exemplary embodiment of the present invention.

FIG. 12 shows a facial feature localization training scheme 840 in an exemplary embodiment of the present invention. This exemplary training scheme aims to estimate the x (horizontal) shift, y (vertical) shift, the scale, and the orientation of the right eye within the standard facial feature window 406. Each eye image 421 is generated by cropping the standard facial feature window 406 of the right eye from the localized facial image 384. The facial landmark points of the face are assumed to be known, and the coordinates of the landmark points 657, after going through the localization based on the two-dimensional facial pose estimation 380 step, are available.

Given an input right eye image 421, the machine having the inherent geometry of (x0, y0, s0, o0) is trained to output the likelihood of the eye image 421 having the inherent geometry. If the input training eye has the (ex, ey, es, eo), then the target output is the Gaussian likelihood: $L=\mathrm{Exp}(-(ex-x0)*(ex-x0)/kx-(ey-y0)*(ey-y0)/ky-(es-s0)*(es-s0)/ks-(eo-o0)*(eo-o0)/ko)$. kx, ky, ks, and ko are constants determined empirically. (ex, ey, es, eo) can be easily determined beforehand using the coordinates of the landmark points relative to the standard facial feature positions and sizes. Each plot in the figure illustrates the responses 813 profile that each machine is trained to learn. Each machine is trained to produce a peak for the eye image 421 having the matching geometry, and to produce gradually lower values as the geometry changes from the inherent geometry of the machine. In this exemplary embodiment, multiple learning machines are employed to estimate the x-location and the scale of the right eye, where each machine is tuned to a specific (x-shift, scale) pair; the figure is illustrated only for the two dimensions (x, s)=(x-shift, scale) for the purpose of clear presentation.

Figure 13:
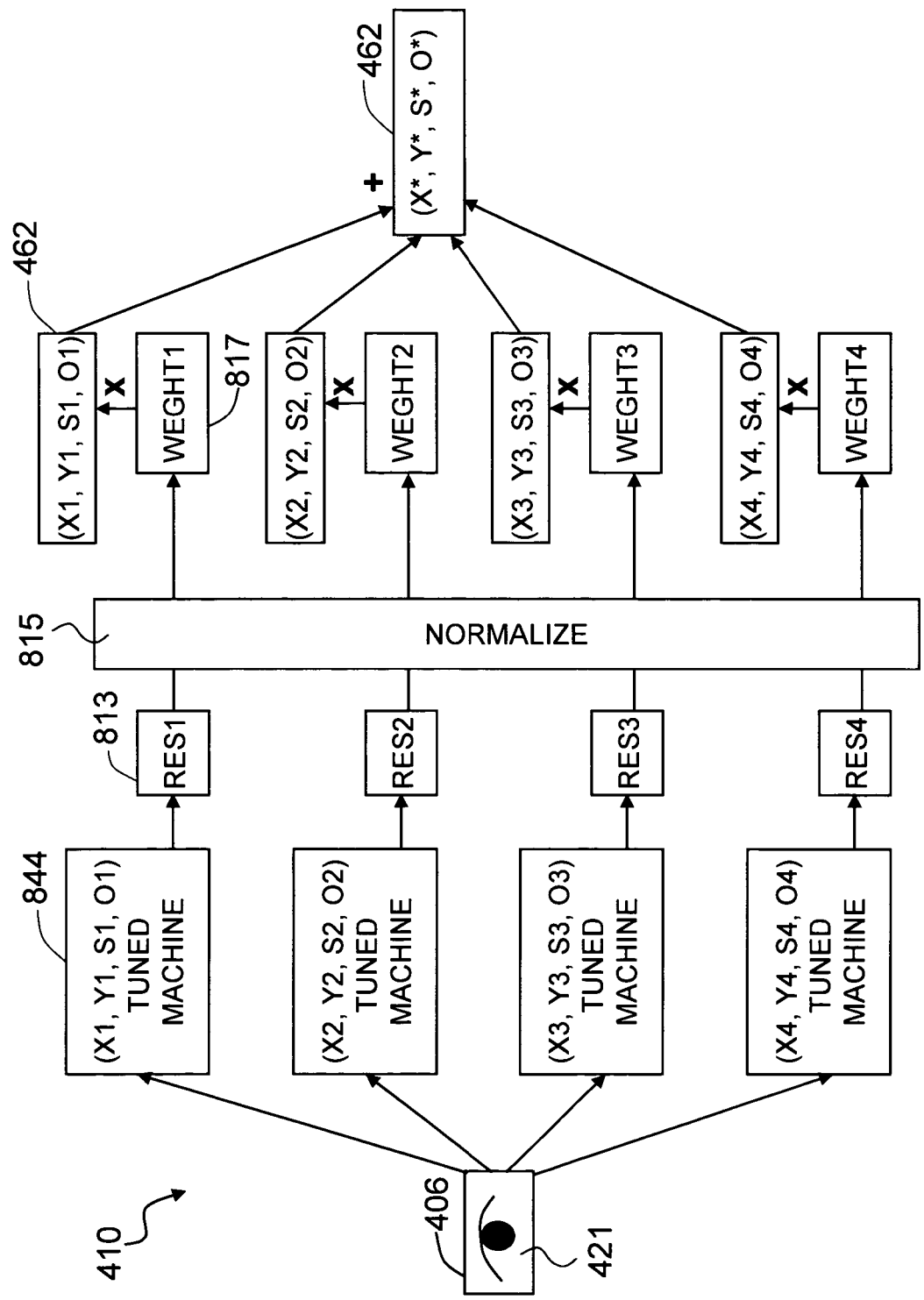
FIG. 13 shows the facial feature localization scheme in an exemplary embodiment of the present invention.

FIG. 13 shows the facial feature localization 410 scheme in an exemplary embodiment of the present invention. The two-dimensional facial pose estimation 380 step and the three-dimensional facial pose estimation 390 step can be performed on a facial image, in a similar manner to the facial feature localization. Once each facial feature tuned machine 844 has been trained to output the likelihood of the given facial feature to have the predetermined pose vector (xi, yi, si, oi), an array of such learning machines can process any facial feature image to compute the likelihoods. In the figure, a given eye image 421 inside the standard facial feature window 406 is fed to the trained learning machines, and then each machine outputs the responses 813 to the particular pose vector 462 (xi, yi, si, oi). The responses are then normalized 815 by dividing them by the sum of the responses to generate the weights 817. The weight is then multiplied to the corresponding pose vector (xi, yi, si, oi). The pose vectors (x1, y1, s1, o1), (xN,yN,sN,oN) are weighted and added up to compute the estimated pose vector (x*, y*, s*, o*). The pose vector represents the difference in position, scale, and orientation that the given eye image 421 has against the standard eye positions and sizes. The pose vector is used to correctly extract the facial features.

Figure 14:
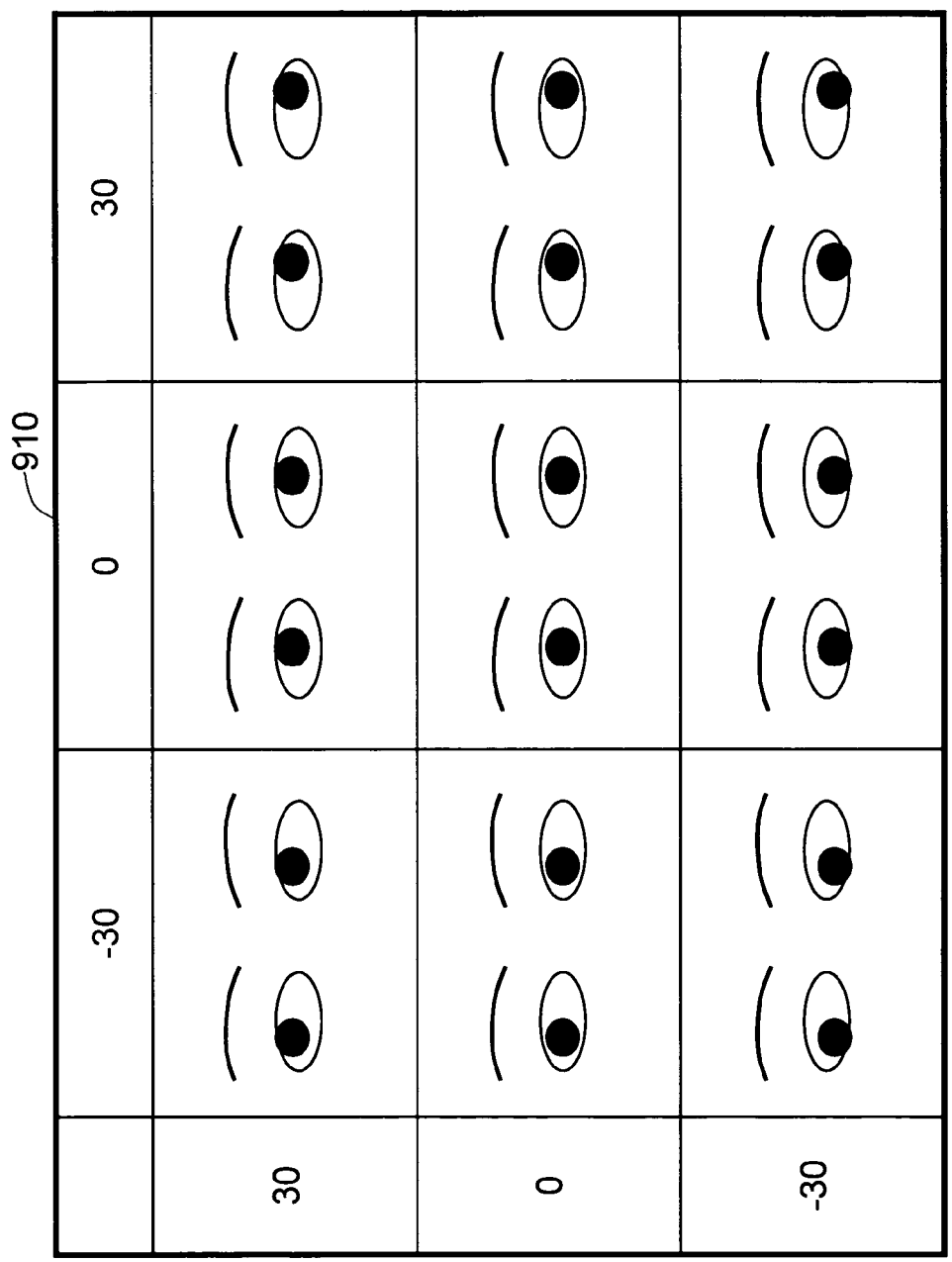
FIG. 14 shows the instances of different eye gaze.

FIG. 14 shows the instances of different eye gaze 910. The columns represent different yaw (horizontal) direction of the eye gaze; the rows represent different pitch (vertical) direction of the eye gaze. Because each eye gaze 910 renders a unique appearance change of the eye, the image signature is used to estimate the eye gaze.

FIG. 15 shows an exemplary embodiment of the eye gaze annotation 962 step that is necessary for the eye gaze estimation training 964 step. In this embodiment, the human annotator determines the degree of confidence 963 of each of the determined eye gaze 910. The eye gaze annotation confidence 963 is introduced to deal with the eye gaze ambiguity that an eye image has; the ambiguity arises due to image resolution, the distance between the face and camera, lighting conditions, eye size and shape, etc. In the figure, the eyes 3 428 image and eyes 5 430 image have less confidence due to the small sizes of the eyes. The eyes 4 429 image has less confidence due to the low resolution. The learning machine trained using the annotated data can estimate both the eye gaze 910 and the level of confidence 963.

Figure 16:
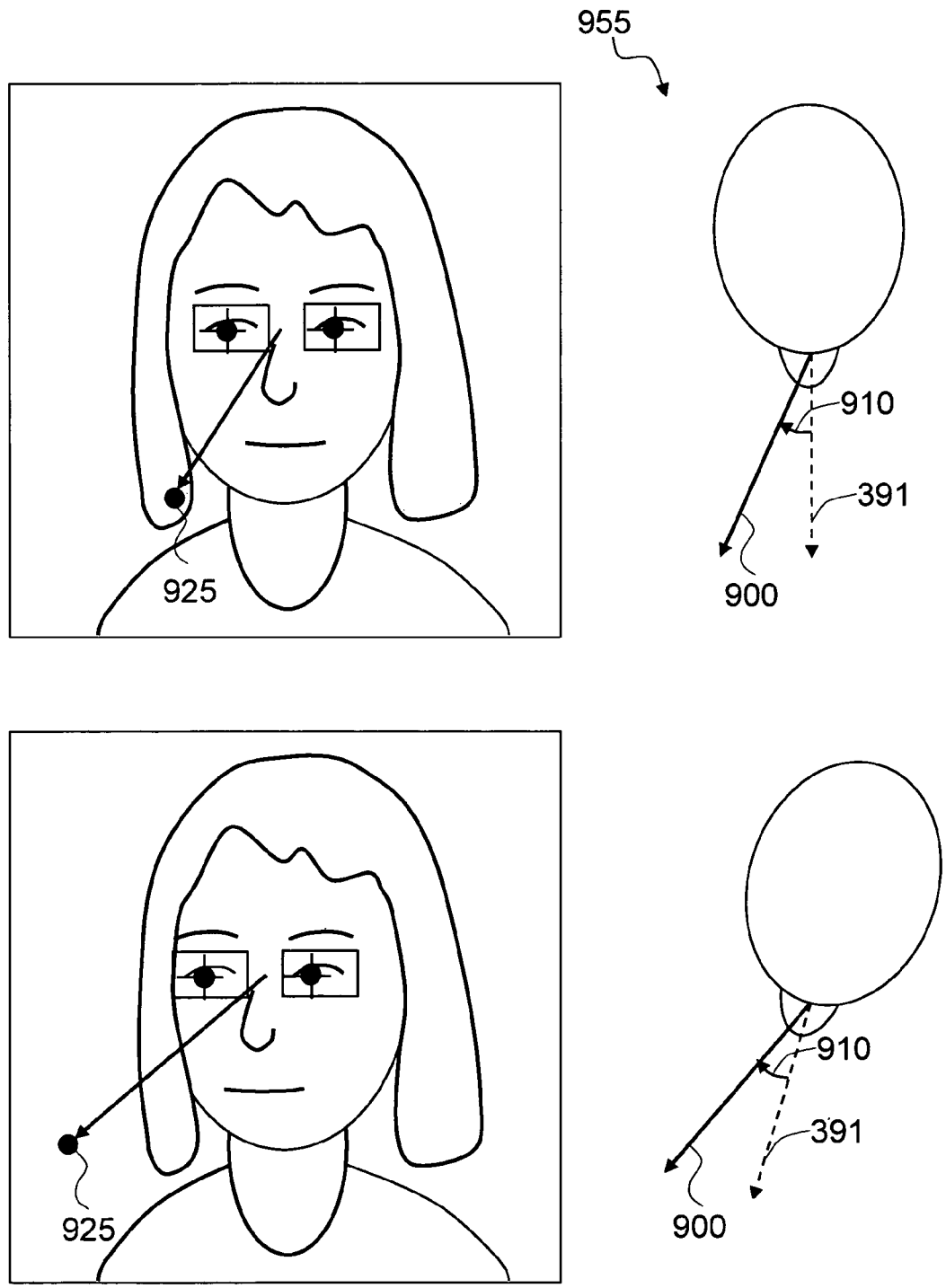
FIG. 16 shows a function of the three-dimensional facial pose-dependent gaze direction estimation step.

FIG. 16 shows a function of the three-dimensional facial pose-dependent gaze direction estimation 955 step. The eye gaze 910 estimated from the eye gaze estimation 960 step is manifested by the movement of the iris, and is independent of the three-dimensional facial pose. Therefore, the two instances of the same eye gaze can actually point to a different gaze target 925 depending on the three-dimensional facial pose 391. In the figure, the top face shows the frontal pose, and the corresponding eye gaze reveals that the person is looking to the right. Therefore, the eye gaze 910 is the only element to estimate the gaze direction 901. In the bottom face, the face is pointing to the right. The eye gaze 910 of the person appears to be very similar to the first face, but needs to be interpreted differently from the case with the top face; the three-dimensional facial pose 391 should be additively incorporated to the final estimate of gaze direction. The way to combine the eye gaze 910 and the three-dimensional facial pose 391 can be learned using a learning machine-based method.

Figure 17:
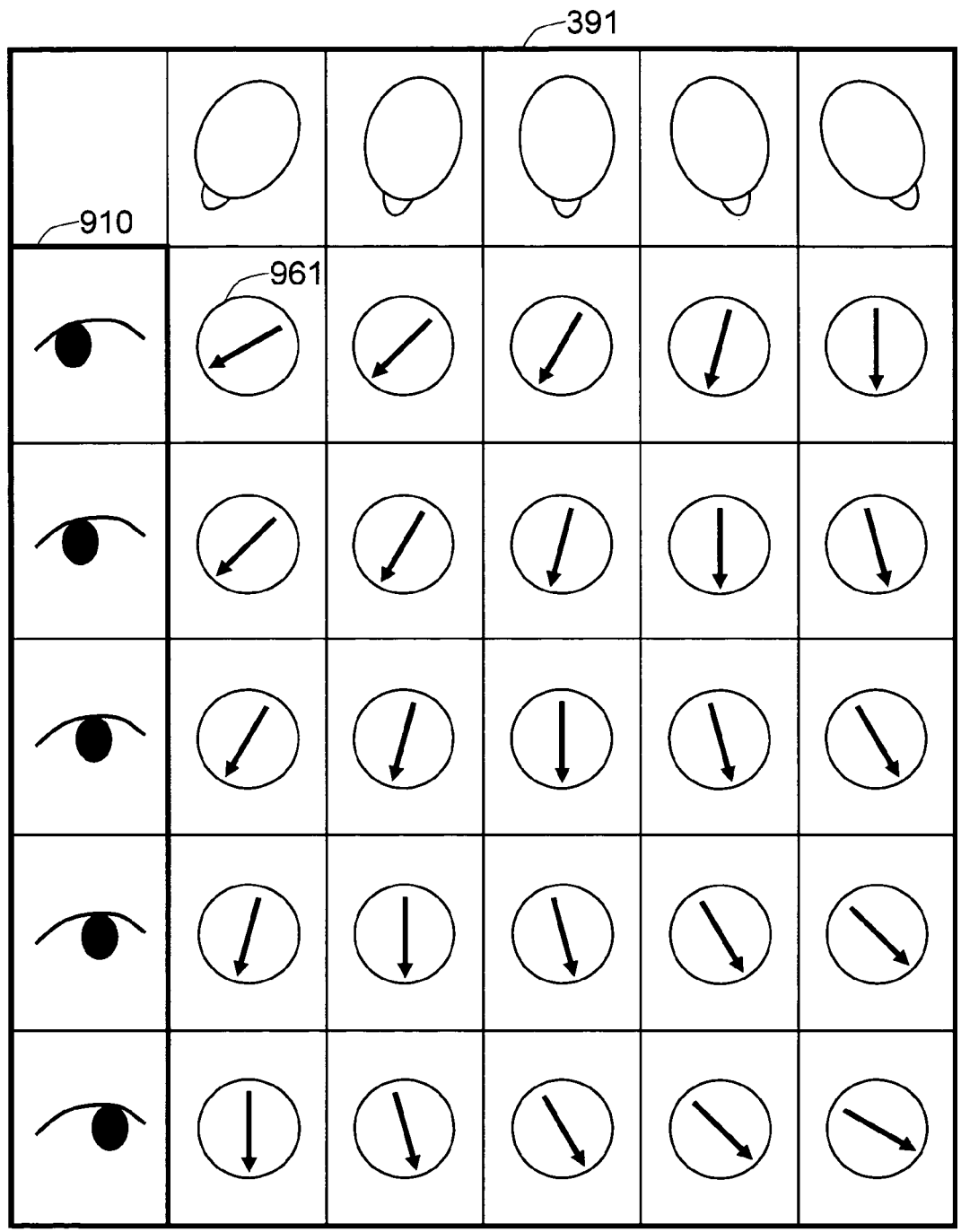
FIG. 17 shows an exemplary scheme of the three-dimensional facial pose-dependent gaze direction estimation step.

FIG. 17 shows an exemplary scheme of the three-dimensional facial pose-dependent gaze direction estimation 955 step. Each column represents a different three-dimensional facial pose 391 (different yaw angles), and each row represents a different eye gaze 910. The orientation of each gaze direction estimate 961 corresponding to the three-dimensional facial pose and eye gaze is illustrated using an arrow in a circle. The middle (third) column shows frontal facial pose, and the horizontal position of the iris relative to the eye simply translates to the gaze direction. When the face is pointing to the right (first column), it gives additive bias (to the right of the person) to the gaze direction estimate.

Figure 18:
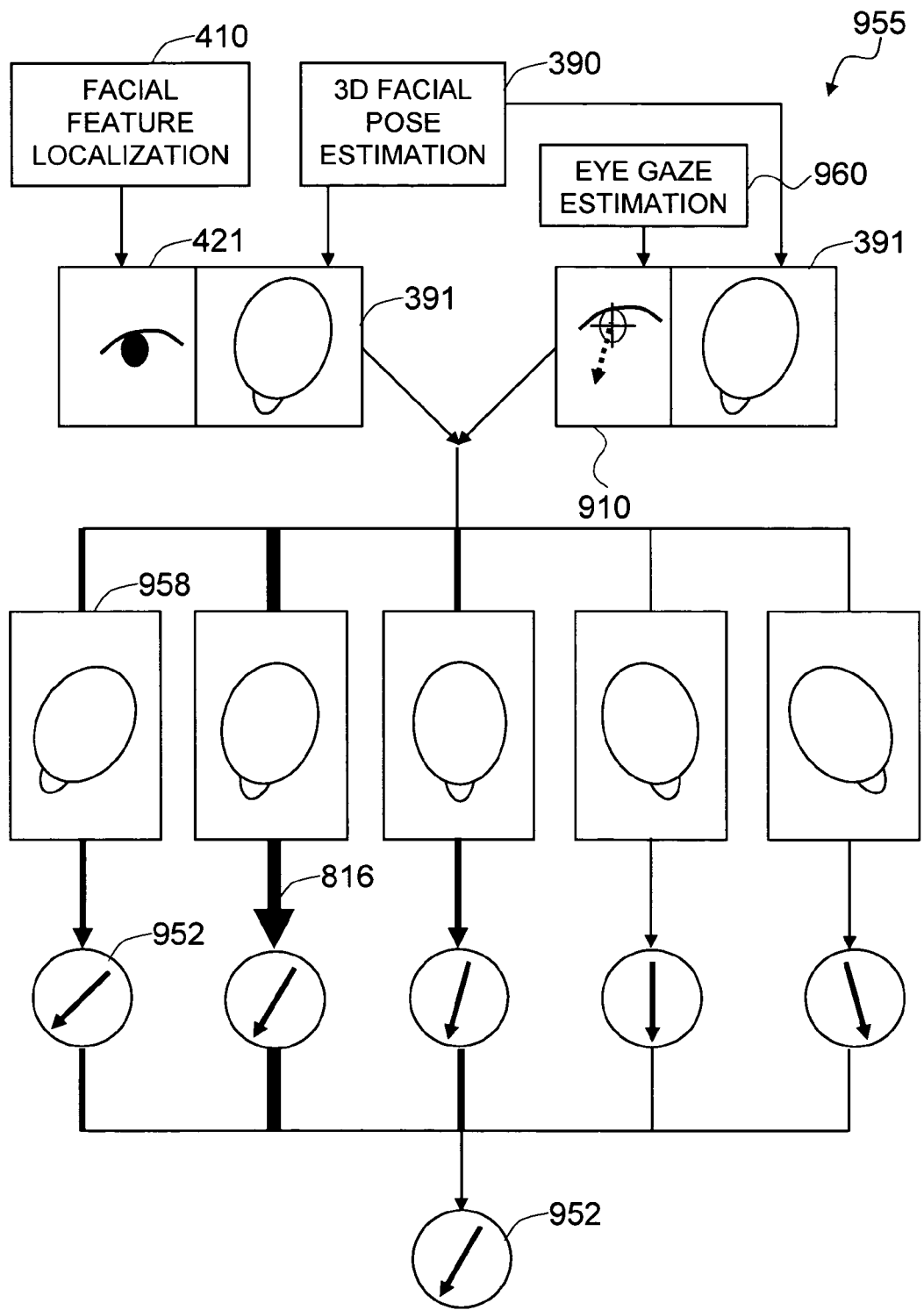
FIG. 18 shows an exemplary embodiment of the three-dimensional facial pose-dependent gaze direction estimation step.

FIG. 18 shows an exemplary embodiment of the three-dimensional facial pose-dependent gaze direction estimation 955 step. In this embodiment, multiple learning machines are used, where each machine is a three-dimensional facial pose-dependent learning machine 958 that is trained for a particular three-dimensional facial pose 391. Once the eye gaze 910 and three-dimensional facial pose 391 are estimated from face view 342, they are fed to each of the machines. In one embodiment, only the machine whose pose range contains the estimated three-dimensional facial pose 391 is activated to estimate the gaze direction. In another embodiment, all the machines are activated, but the output gaze direction estimates are weighted to produce the gaze direction estimate; the weight 816 is proportional to a measure of similarity between the estimated three-dimensional facial pose and the inherent pose of the machine. In the figure, the weight 816 is denoted as the thickness of the arrow.

In a scenario when the eye images are not large enough for a reliable eye gaze estimation, the normalized eye image 421 (instead of estimated eye gaze) along with the three-dimensional facial pose is fed to the machines to estimate the gaze direction. In this embodiment, the machines are trained to process the normalized eye image 421 and the three-dimensional facial pose estimate 391, instead of trained to process the eye gaze 910 and the three-dimensional facial pose estimate 391.

Figure 19:
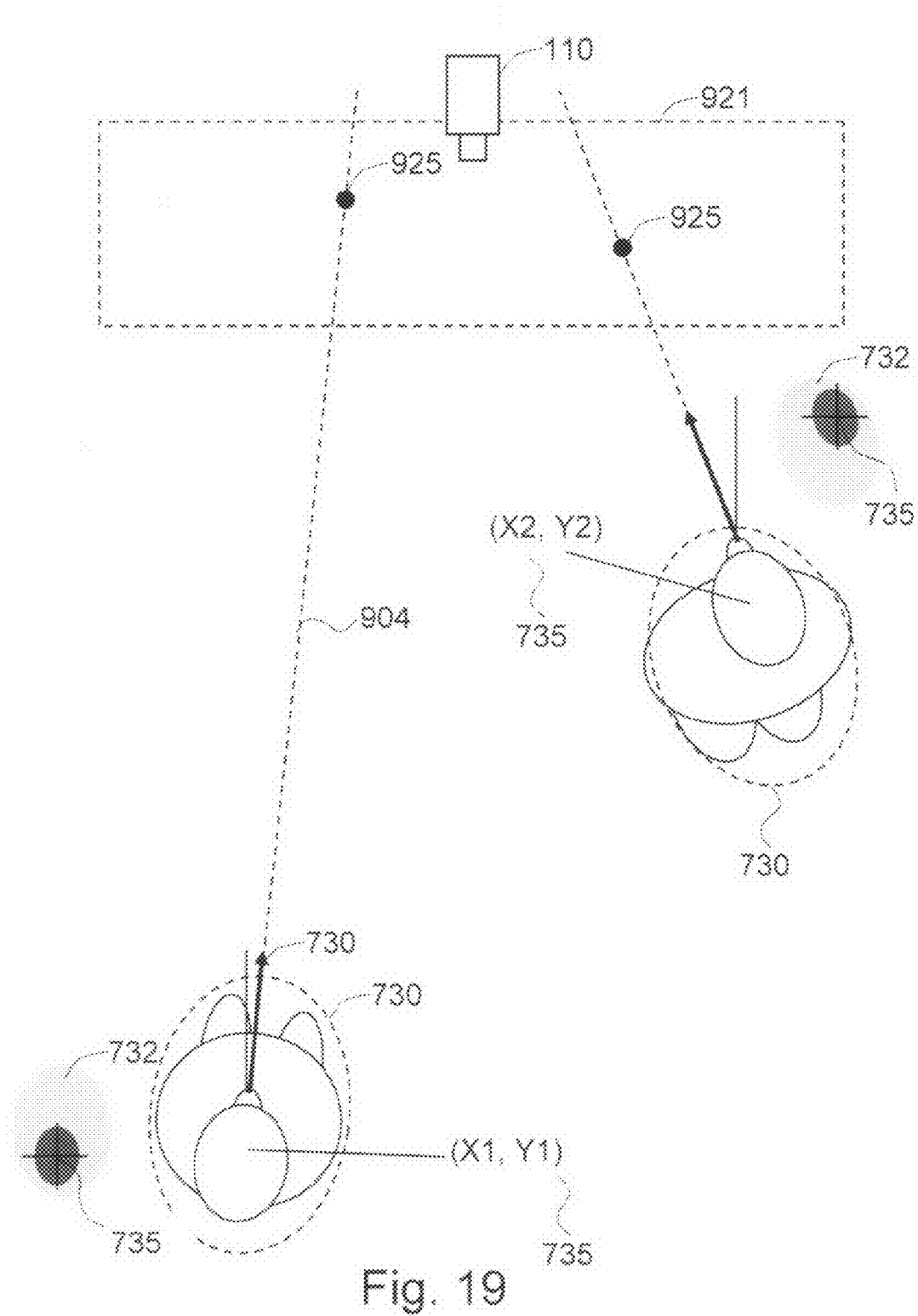
FIG. 19 shows the person position estimation and gaze target estimation step in an exemplary embodiment of the present invention.

FIG. 19 shows the person position estimation 725 and gaze target estimation 970 steps in an exemplary embodiment of the present invention. The person position estimation 725 step provides the world coordinate of the person—more precisely, the position of the head 735. From the detected body from the body detection 720 and body tracking 721 steps, the view-based person blob model 732 is employed to estimate the body blob 730 in the view-based body blob estimation 733 step. The view-based person blob model 732 consists of an approximate shape of a body outline and the position of the head in each floor position. Once the body blob 730 is estimated, the head position 735 is located based on the model. The gaze direction estimation 950 step provides the gaze direction estimate 952, which is the orientation of gaze direction relative to the face-view camera 110. The visual target 920 depends on the face-view camera 110 orientation and the position of the person as shown in the figure; first the gaze direction 901 is interpreted for each face-view camera 110 using the gaze to target grid mapping 974 to estimate the gaze line 904. The coordinate of the gaze target is estimated by finding the intersection of the gaze line 904 with the visual target plane 921. The gaze line 904 is a line originating from the person's position having the same orientation as the estimated gaze direction.

Figure 20:
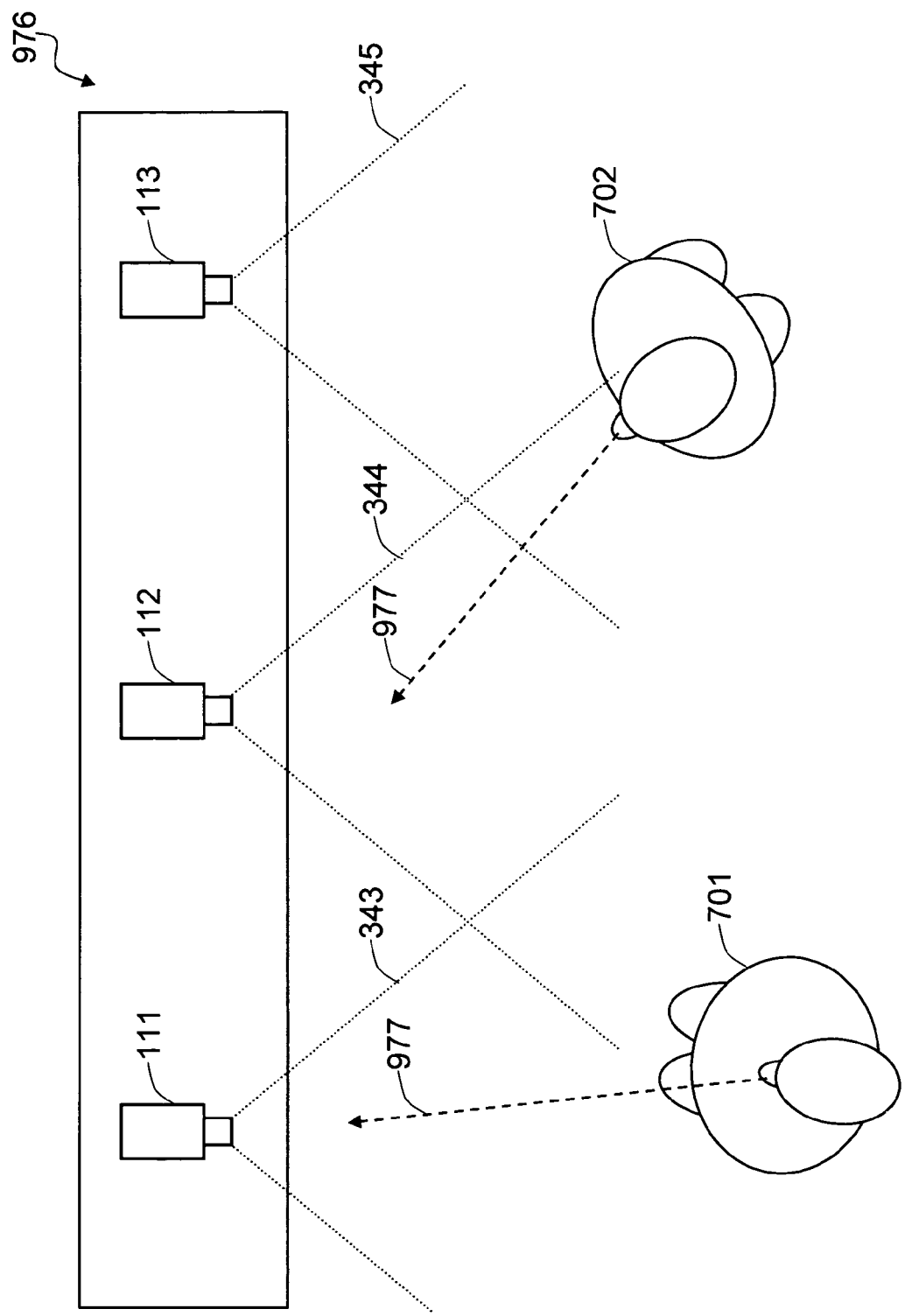
FIG. 20 shows the view selection scheme in an exemplary embodiment of the present invention.

FIG. 20 shows the view selection 976 scheme in an exemplary embodiment of the present invention. When the system employs multiple face-view cameras, one person's face can appear to more than one face view 342. Because the accuracy of the gaze target estimation 970 greatly depends on the accuracy of the eye gaze estimation 960, it is crucial to choose the view that provides a better view of the face—more specifically, the eyes. The step chooses the best view of the face based on the person position 724 and the three-dimensional facial pose 391 of the person, because both the distance between the face and the camera and the three-dimensional facial pose relative to the camera affect the view. In the figure, the face of person 1 701 may appear to both the face view 1 343 and face view 2 344. The face view 1 343 is the selected view 977 for the person 1 701 based on the close distance to the face-view camera 1 111. The face of person 2 702 can appear to both the face view 2 344 and the face view 3 345. The person is slightly closer to the face-view camera 3 113, but is facing the face-view camera 2 112. Therefore, the face view 2 344 is the selected view 977. The correspondence of a person appearing to different views is made based on the person position estimate; the person position estimate also provides distance of the person to each of the cameras.

Figure 21:
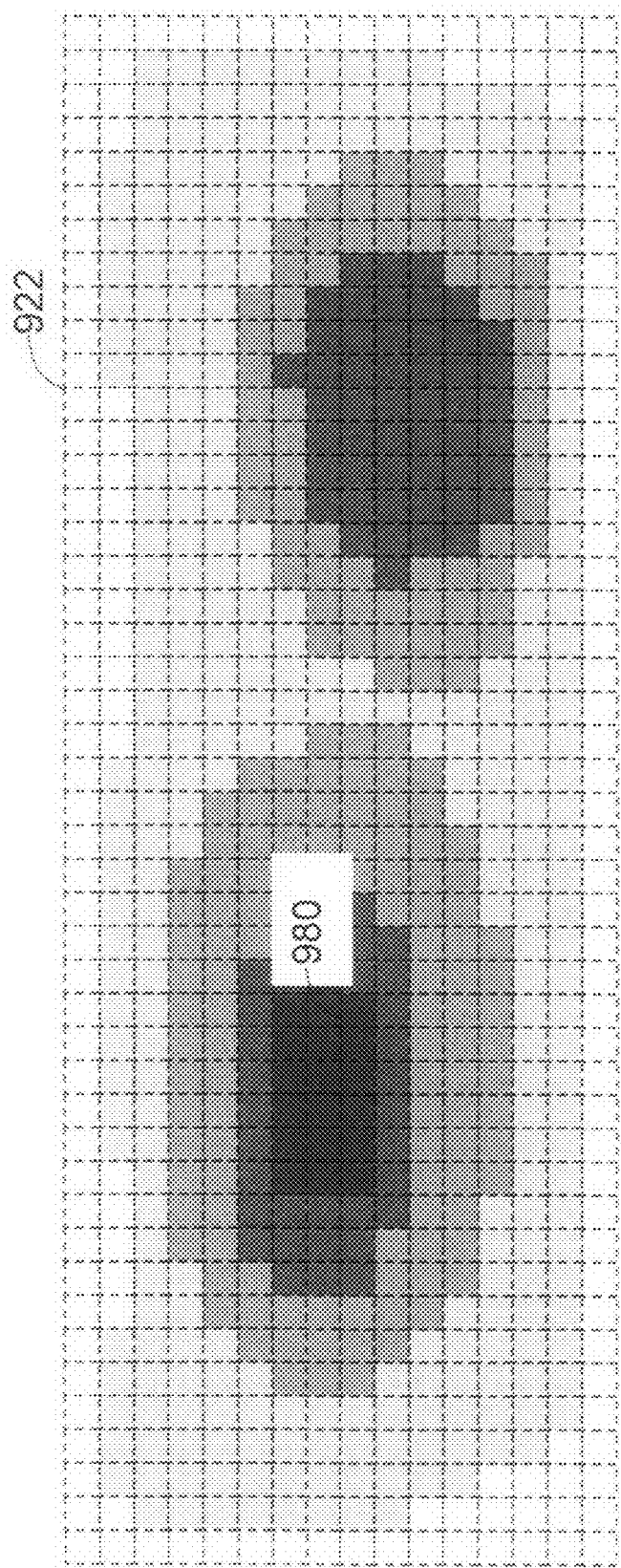
FIG. 21 shows an estimated gaze map.

FIG. 21 shows an estimated gaze map 980. The darker regions represent areas receiving more frequent gaze. The gaze map can reveal how much a certain region in the visual target receives people's attention.

Figure 22:
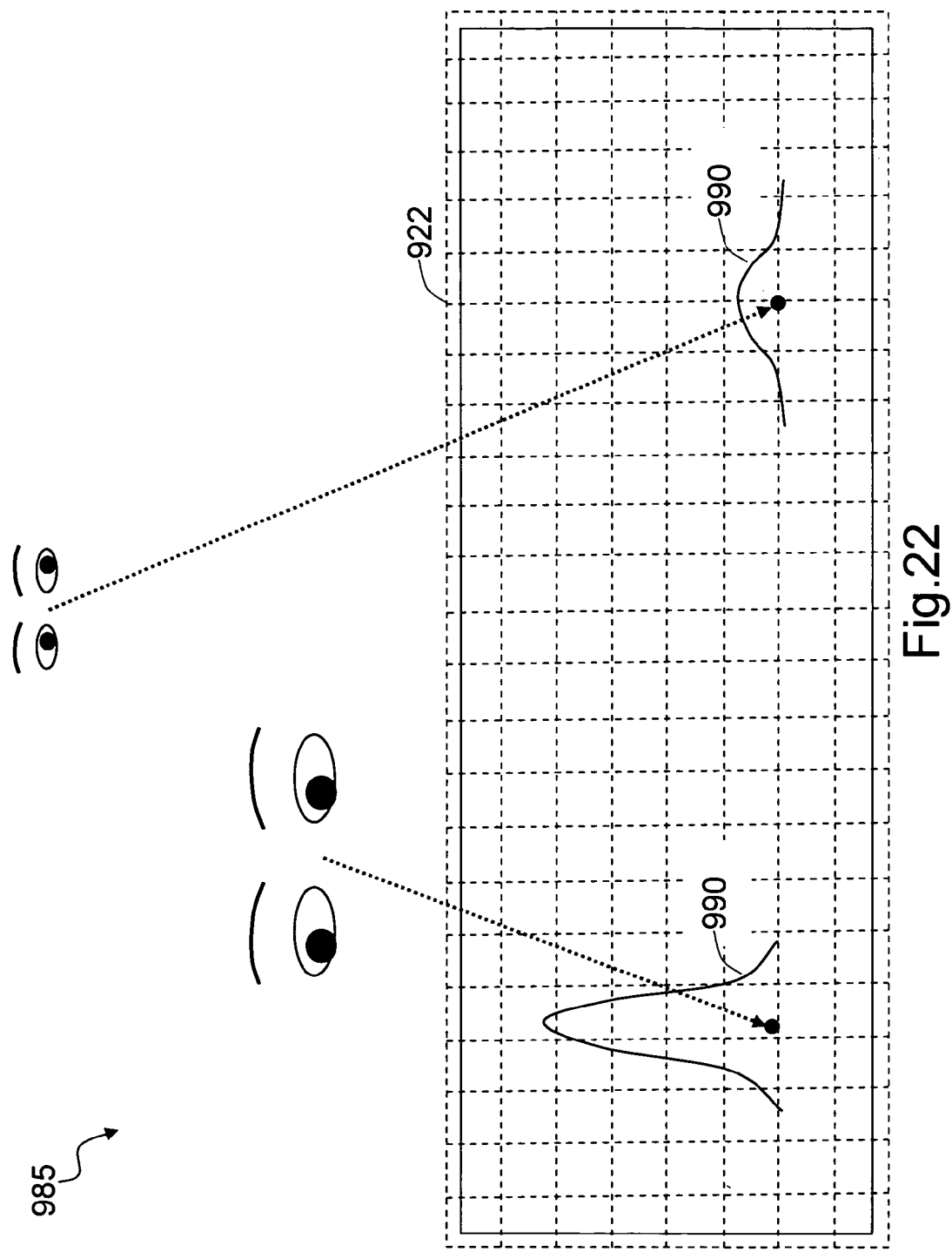
FIG. 22 shows an exemplary embodiment of the weighed voting scheme for gaze map estimation.

FIG. 22 shows an exemplary embodiment of the weighed voting scheme for gaze map estimation 985. The scheme serves to address the issue of varying degree of confidence level for gaze target estimates 972. The level of confidence 963 corresponding to each eye gaze estimate 961 computed from the eye gaze estimation 960 step naturally translates into the confidence level for the gaze target estimate 972. In the figure, the gaze target estimation 970 step computed higher confidence value to the eye gaze estimate 961 for the left eye image than for the right eye image. In this embodiment, the higher confidence gaze target estimate contributes more to the gaze map 980 in the form of narrow Gaussian-like function 990. The lower confidence gaze target estimate contributes less to the gaze map 980 in the form of flat Gaussian-like function 990. The degree of confidence is reflected not only in the shape of the function, but also in the total weight of contribution.

Figure 23:
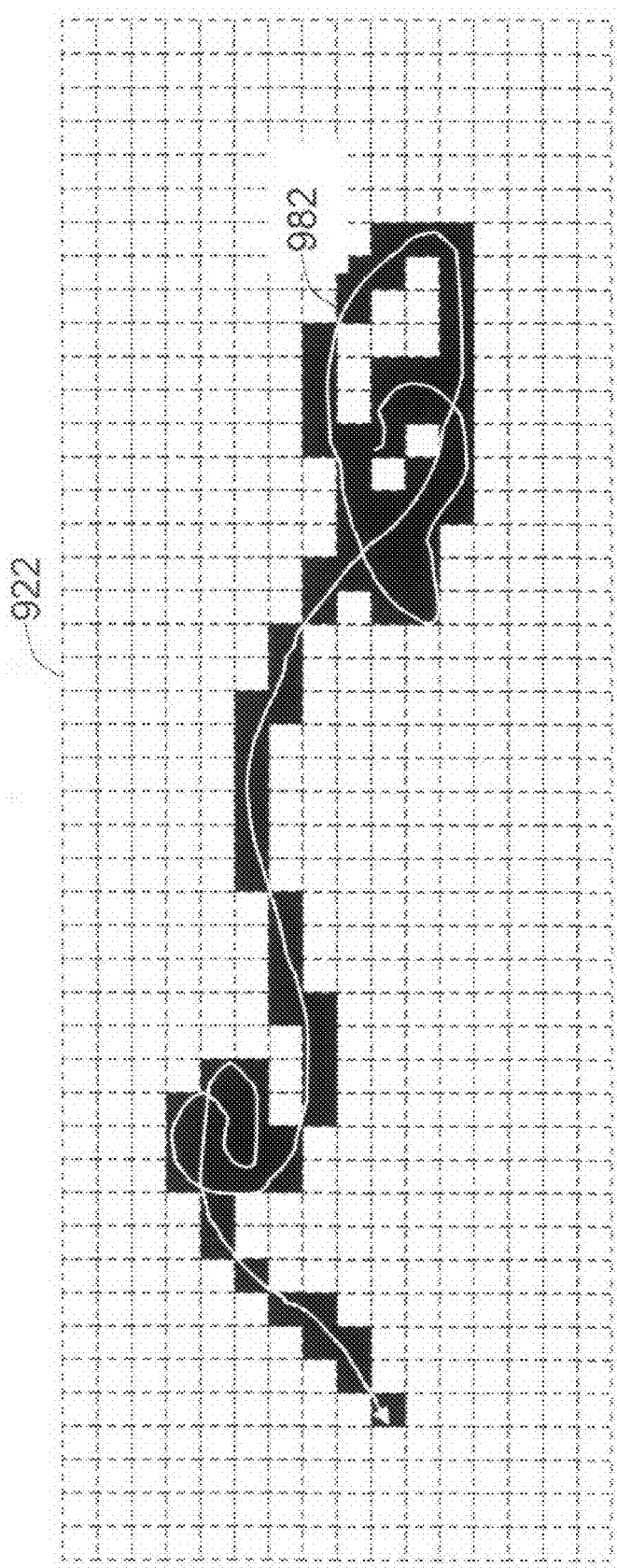
FIG. 23 shows an estimated gaze trajectory.

FIG. 23 shows an estimated gaze trajectory 982 of a single viewer 705. The plot can reveal how the interest of the viewer 705 changes over the span of viewing.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for estimating a gaze target within a visual target that a person is looking based on automatic image measurements, comprising the following steps of:
    a) processing calibrations for at least a first means for capturing images for face-view and at least a second means for capturing images for top-down view,
    b) determining a target grid of the visual target,
    c) detecting and tracking a face of the person from first input images captured by the first means for capturing images,
    d) estimating a two-dimensional pose and a three-dimensional pose of the face,
    e) localizing facial features to extract an eye image of the face,
    f) estimating eye gaze of the person and estimating gaze direction of the person based on the estimated eye gaze and the three-dimensional facial pose of the person,
    g) detecting and tracking the person from second input images captured by the second means for capturing images,
    h) estimating a head position using the top-down view calibration, and
    i) estimating the gaze target of the person from the estimated gaze direction and the head position of the person using the face-view calibration.

2. The method according to claim 1, wherein the method further comprises a step of taking geometric measurements of the site and the visual target to come up with specifications and the calibrations for the means for capturing images.

3. The method according to claim 1, wherein the method further comprises steps of:
    a) estimating a gaze direction estimation error distribution, and
    b) determining the target grid based on the gaze direction estimation error distribution and average distance between the person and the visual target.

4. The method according to claim 1, wherein the method further comprises a step of determining a mapping from the estimated head position and the estimated gaze direction to the target grid.

5. The method according to claim 1, wherein the method further comprises a step of determining the mapping from the second input image coordinate to the floor coordinate, based on the position and orientation of the first means for capturing images.

6. The method according to claim 1, wherein the method further comprises a step of training a plurality of first machines for estimating the three-dimensional pose of the face.

7. The method according to claim 1, wherein the method further comprises a step of training a plurality of second machines for estimating the two-dimensional pose of the face.

8. The method according to claim 1, wherein the method further comprises a step of training a plurality of third machines for localizing each facial feature of the face.

9. The method according to claim 1, wherein the method further comprises a step of training at least a fourth machine for estimating the eye gaze from the eye image.

10. The method according to claim 9, wherein the method further comprises a step of annotating the eye images with both the eye gaze and a confidence level of the eye gaze annotation.

11. The method according to claim 10, wherein the method further comprises a step of training the fourth machine so that the machine outputs both the eye gaze and the confidence level of the eye gaze estimate.

12. The method according to claim 1, wherein the method further comprises a step of training at least a fifth machine for estimating the gaze direction.

13. The method according to claim 12, wherein the method further comprises a step of training the fifth machine for estimating the gaze direction from the eye gaze and the three-dimensional facial pose.

14. The method according to claim 12, wherein the method further comprises a step of employing the fifth machine for estimating the gaze direction from the eye image and the three-dimensional facial pose.

15. The method according to claim 12, wherein the method further comprises a step of training the fifth machine so that the machine outputs both the gaze direction and the confidence level of the gaze direction estimate.

16. The method according to claim 15, wherein the method further comprises a step of estimating a gaze map by weighting each of the gaze target estimates with the confidence levels corresponding to the gaze direction estimates.

17. The method according to claim 1, wherein the method further comprises a step of selecting a stream of first input images among a plurality of streams of first input images when the person's face appears to more than one stream of first input images, based on the person's distance to each of the plurality of first means for capturing images and the three-dimensional facial poses relative to each of the plurality of first means for capturing images.

18. The method according to claim 1, wherein the method further comprises a step of utilizing a view-based body blob model to estimate the head position of the person.

19. The method according to claim 1, wherein the method further comprises a step of constructing a gaze trajectory and a gaze map based on the estimated gaze target.

20. An apparatus for estimating a gaze target within a visual target that a person is looking based on automatic image measurements, comprising:
    a) means for processing calibrations for at least a first means for capturing images for face-view and at least a second means for capturing images for top-down view,
    b) means for determining a target grid of the visual target, c) means for detecting and tracking a face of the person from first input images captured by the first means for capturing images, d) means for estimating a two-dimensional pose and a three-dimensional pose of the face, e) means for localizing facial features to extract an eye image of the face, f) means for estimating eye gaze of the person and estimating gaze direction of the person based on the estimated eye gaze and the three-dimensional facial pose of the person, g) means for detecting and tracking the person from second input images captured by the second means for capturing images, h) means for estimating a head position using the top-down view calibration, and i) means for estimating the gaze target of the person from the estimated gaze direction and the head position of the person using the face-view calibration.

21. The apparatus according to claim 20, wherein the apparatus further comprises means for taking geometric measurements of the site and the visual target to come up with specifications and the calibrations for the means for capturing images.

22. The apparatus according to claim 20, wherein the apparatus further comprises:

a) means for estimating a gaze direction estimation error distribution, and b) means for determining the target grid based on the gaze direction estimation error distribution and average distance between the person and the visual target.

23. The apparatus according to claim 20, wherein the apparatus further comprises means for determining a mapping from the estimated head position and the estimated gaze direction to the target grid.

24. The apparatus according to claim 20, wherein the apparatus further comprises means for determining the mapping from the second input image coordinate to the floor coordinate, based on the position and orientation of the first means for capturing images.

25. The apparatus according to claim 20, wherein the apparatus further comprises means for training a plurality of first machines for estimating the three-dimensional pose of the face.

26. The apparatus according to claim 20, wherein the apparatus further comprises means for training a plurality of second machines for estimating the two-dimensional pose of the face.

27. The apparatus according to claim 20, wherein the apparatus further comprises means for training a plurality of third machines for localizing each facial feature of the face.

28. The apparatus according to claim 20, wherein the apparatus further comprises means for training at least a fourth machine for estimating the eye gaze from the eye image.

29. The apparatus according to claim 28, wherein the apparatus further comprises means for annotating the eye images with both the eye gaze and a confidence level of the eye gaze annotation.

30. The apparatus according to claim 29, wherein the apparatus further comprises means for training the fourth machine so that the machine outputs both the eye gaze and the confidence level of the eye gaze estimate.

31. The apparatus according to claim 20, wherein the apparatus further comprises means for training at least a fifth machine for estimating the gaze direction.

32. The apparatus according to claim 31, wherein the apparatus further comprises means for training the fifth machine for estimating the gaze direction from the eye gaze and the three-dimensional facial pose.

33. The apparatus according to claim 31, wherein the apparatus further comprises means for employing the fifth machine for estimating the gaze direction from the eye image and the three-dimensional facial pose.

34. The apparatus according to claim 31, wherein the apparatus further comprises means for training the fifth machine so that the machine outputs both the gaze direction and the confidence level of the gaze direction estimate.

35. The apparatus according to claim 34, wherein the apparatus further comprises means for estimating a gaze map by weighting each of the gaze target estimates with the confidence levels corresponding to the gaze direction estimates.

36. The apparatus according to claim 20, wherein the apparatus further comprises means for selecting a stream of first input images among a plurality of streams of first input images when the person's face appears to more than one stream of first input images, based on the person's distance to each of the plurality of first means for capturing images and the three-dimensional facial poses relative to each of the plurality of first means for capturing images.

37. The apparatus according to claim 20, wherein the apparatus further comprises means for utilizing a view-based body blob model to estimate the head position of the person.

38. The apparatus according to claim 20, wherein the apparatus further comprises means for constructing a gaze trajectory and a gaze map based on the estimated gaze target.

* * * * *